(12) United States Patent  
Perera et al.

(10) Patent No.: US 8,669,200 B2  
(45) Date of Patent: Mar. 11, 2014

(54) HOLLOW FIBRES

(75) Inventors: Semali Priyanthi Perera, Bath (GB); Chin-Chih Tai, Kaohsiung Hsien (TW)

(73) Assignee: The University of Bath (GB)

( * ) Notice: Subject to any disclaimer, the term of this patent is extended or adjusted under 35 U.S.C. 154(b) by 289 days.

(21) Appl. No.: 11/995,086

(22) PCT Filed: Jul. 7, 2006

(86) PCT No.: PCT/GB2006/002509  
§ 371 (c)(1), (2), (4) Date: Aug. 8, 2008

(87) PCT Pub. No.: WO2007/007051  
PCT Pub. Date: Jan. 18, 2007

(65) Prior Publication Data  
US 2009/0305871 A1    Dec. 10, 2009

(30) Foreign Application Priority Data

Jul. 8, 2005  (GB) .................................. 0514026.4  
Aug. 16, 2005 (GB) .................................. 0516804.2

(51) Int. Cl.  
*B01J 29/87* (2006.01)  
*D02G 3/00* (2006.01)  
*A01J 25/12* (2006.01)  
*B32B 25/12* (2006.01)  
*B32B 27/00* (2006.01)

(52) U.S. Cl.  
USPC ... 502/60; 428/376; 264/171.26; 264/171.28; 425/464

(58) Field of Classification Search  
None  
See application file for complete search history.

(56) References Cited

U.S. PATENT DOCUMENTS

| | | | | |
|---|---|---|---|---|
| 4,175,153 A | * | 11/1979 | Dobo et al. | 428/398 |
| 4,187,282 A | * | 2/1980 | Matsuda et al. | 423/244.1 |
| 4,348,458 A | * | 9/1982 | Otstot | 428/366 |
| 4,362,677 A | * | 12/1982 | Yamashita et al. | 264/41 |
| 5,087,278 A | * | 2/1992 | Suzuki | 55/523 |
| 5,935,431 A | * | 8/1999 | Korin | 210/205 |
| 6,500,233 B1 | * | 12/2002 | Miller et al. | 95/50 |
| 6,573,208 B1 | * | 6/2003 | Soria et al. | 501/95.1 |
| 2004/0261459 A1 | * | 12/2004 | Wolter et al. | 65/393 |
| 2005/0072114 A1 | * | 4/2005 | Shiao et al. | 52/782.1 |
| 2006/0099414 A1 | * | 5/2006 | Koops et al. | 428/364 |

FOREIGN PATENT DOCUMENTS

| | | |
|---|---|---|
| EP | 1627941 | 2/2006 |
| FR | 2616812 | 12/1988 |
| JP | 62117812 | 5/1987 |
| JP | 01052814 | 2/1989 |
| JP | 01068520 | 3/1989 |
| WO | WO 9312868 | * 7/1993 |
| WO | WO9312868 | 7/1993 |
| WO | WO2004003268 | 1/2004 |

OTHER PUBLICATIONS

Chou et al, Jou Mem Scie 250 (2005) 259-267.*  
Chou et al, J Membrane Science, 250 (2005), 259-267.*

* cited by examiner

*Primary Examiner* — Bijay Saha  
(74) *Attorney, Agent, or Firm* — The Belles Group, P.C.

(57) ABSTRACT

A hollow fibre containing one or more layers having a mean pore size in one or more of said layers of less than 100μm. The invention also extends to a method for preparing porous hollow fibres and to the apparatus for preparing said fibres.

17 Claims, 28 Drawing Sheets

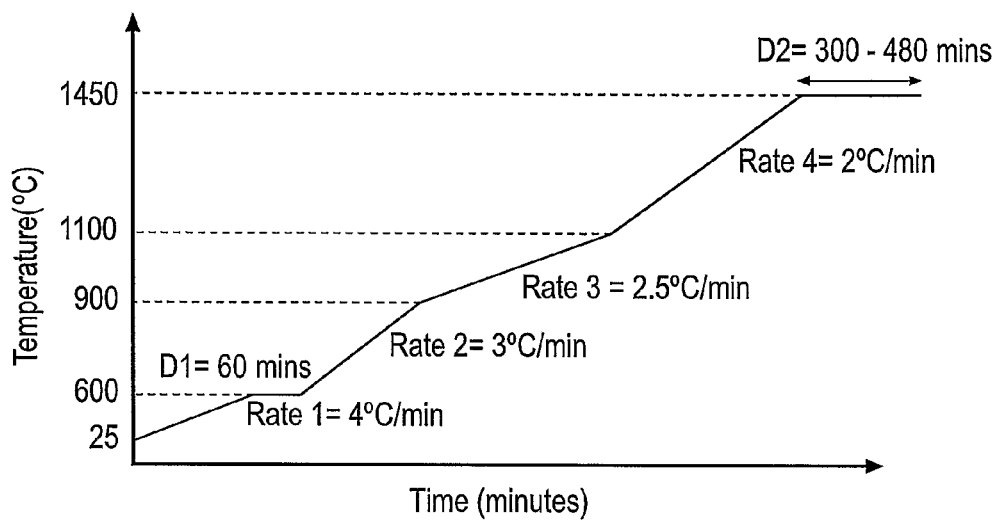
Fig. 2
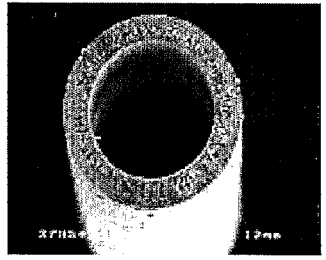 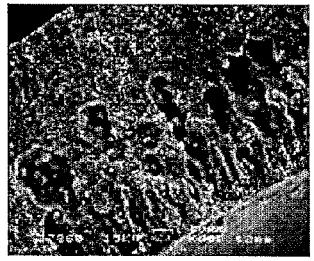 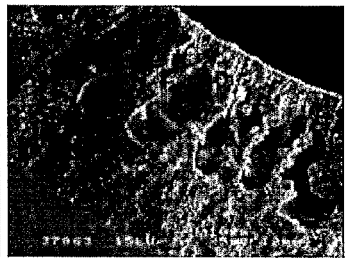
Fig. 3(a)  Fig. 3(b)  Fig. 3(c)
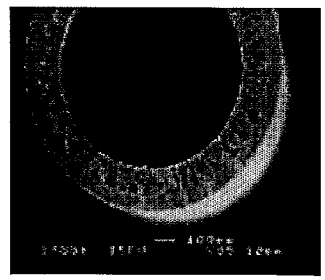 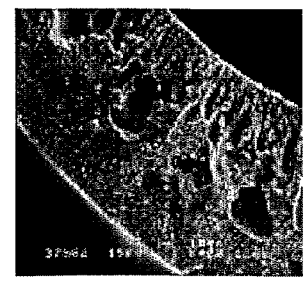 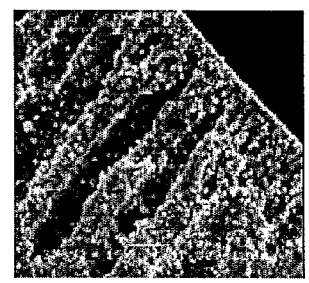
Fig. 4(a)  Fig. 4(b)  Fig. 4(c)

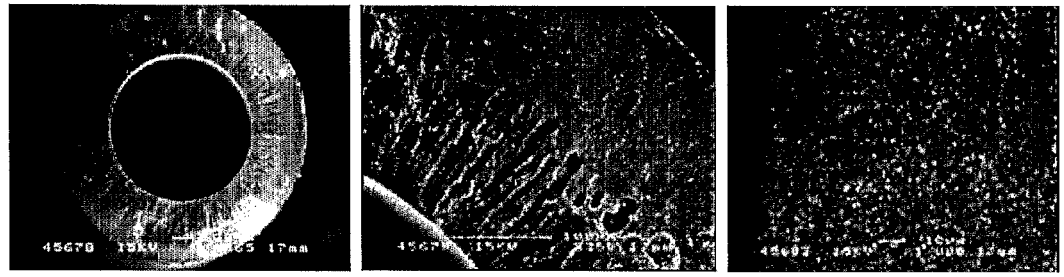
Fig. 12
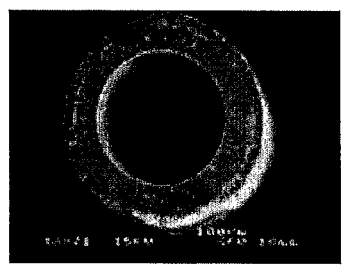 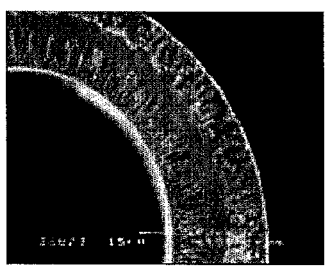 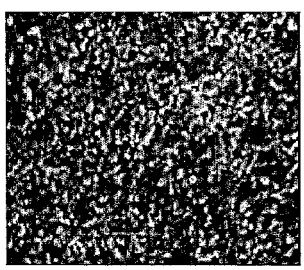
Fig. 13(a)　　　Fig. 13(b)　　　Fig. 13(c)
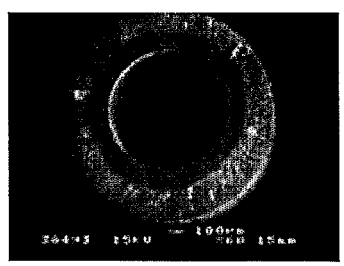  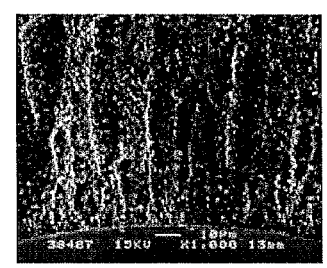
Fig. 14(a)　　　Fig. 14(b)　　　Fig. 14(c)

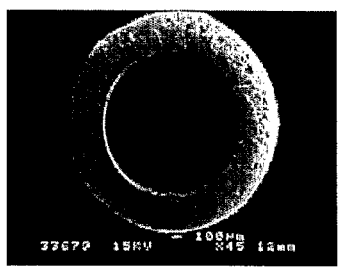 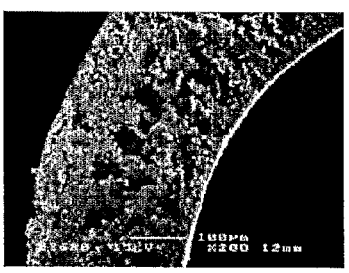 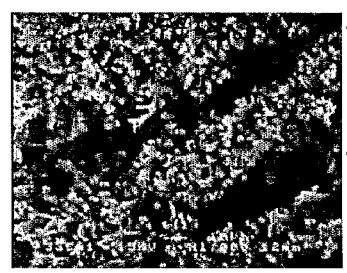
Fig. 19(a)   Fig. 19(b)   Fig. 19(c)
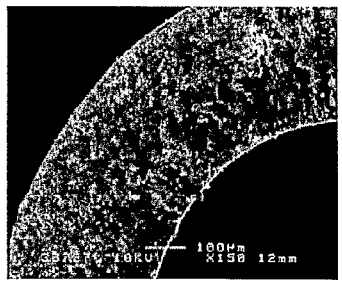 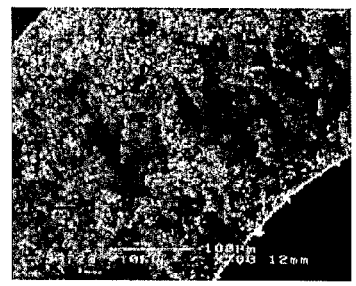 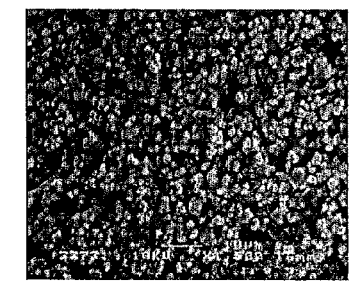
Fig. 19(d)   Fig. 19(e)   Fig. 19(f)

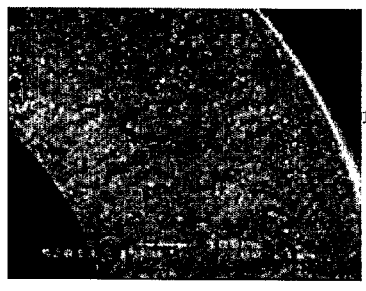  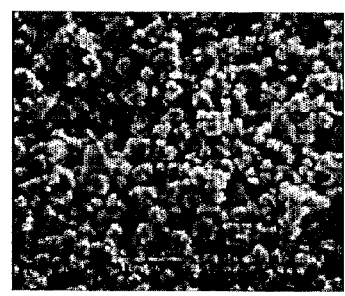
Fig. 20(a)  Fig. 20(b)  Fig. 20(c)
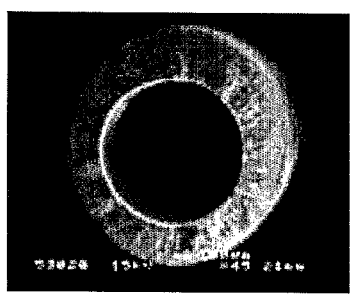 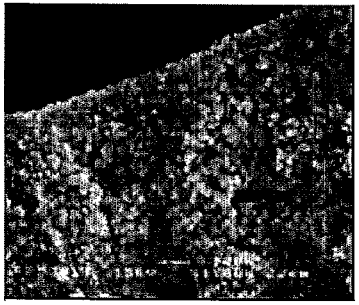 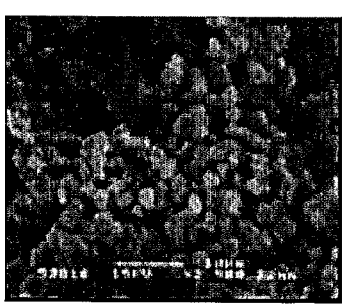
Fig. 20(d)  Fig. 20(e)  Fig. 20(f)

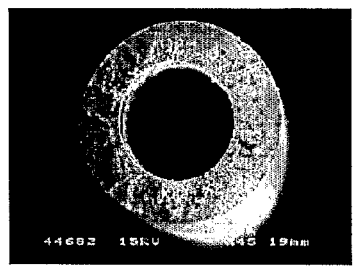 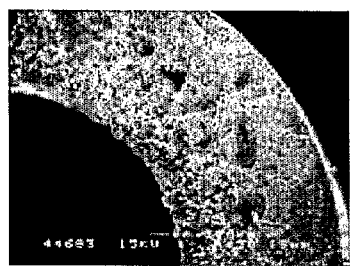 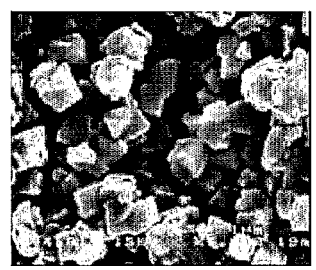
Fig. 21(a)  Fig. 21(b)  Fig. 21(c)
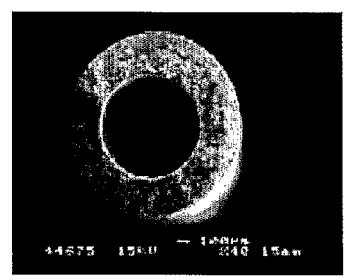 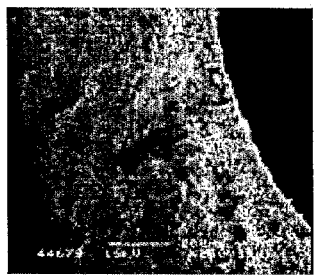 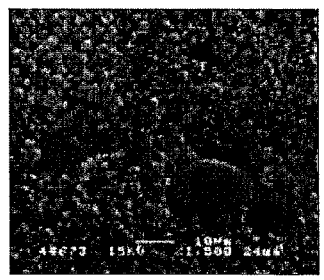
Fig. 22(a)  Fig. 22(b)  Fig. 22(c)
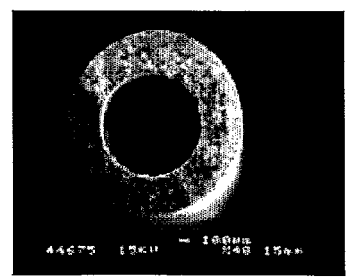
Fig. 23

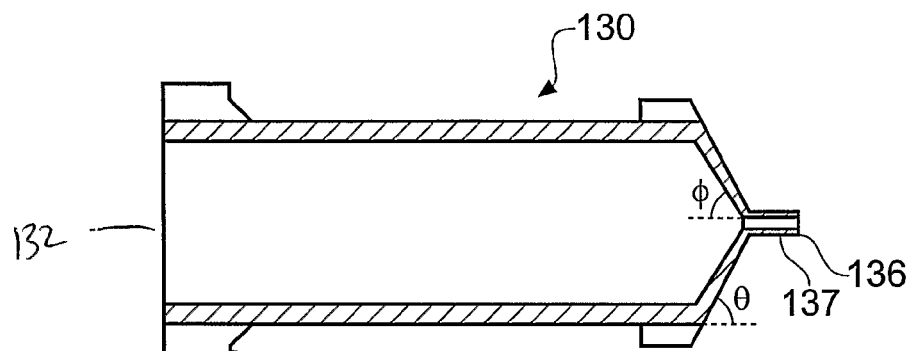
Fig. 29
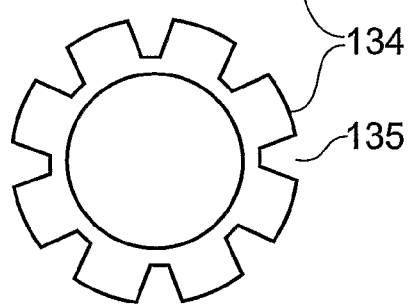
Fig. 29a
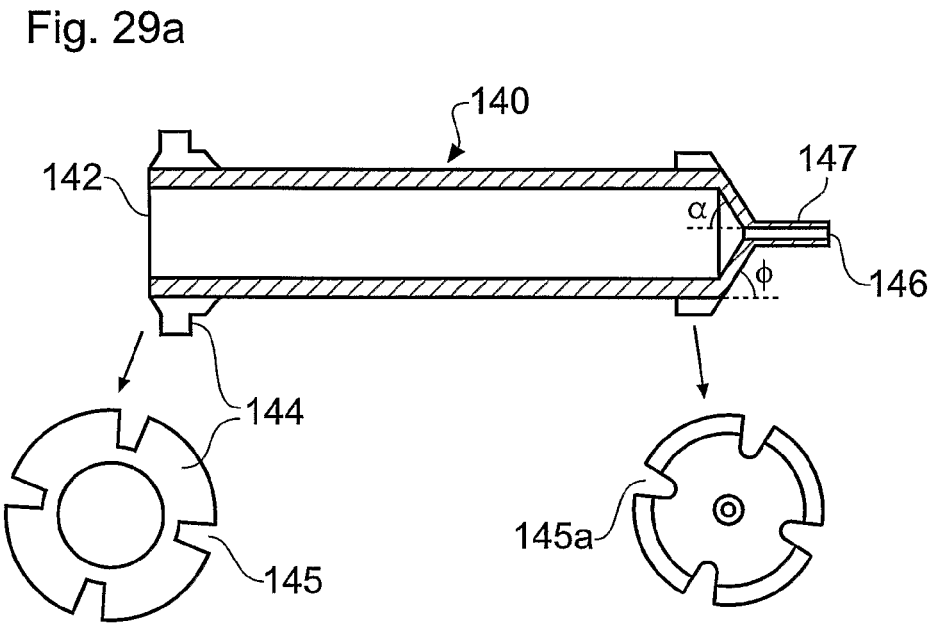
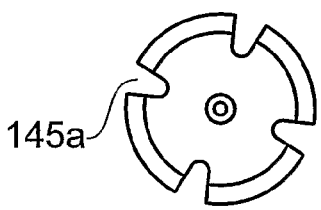
Fig. 30a          Fig. 30b

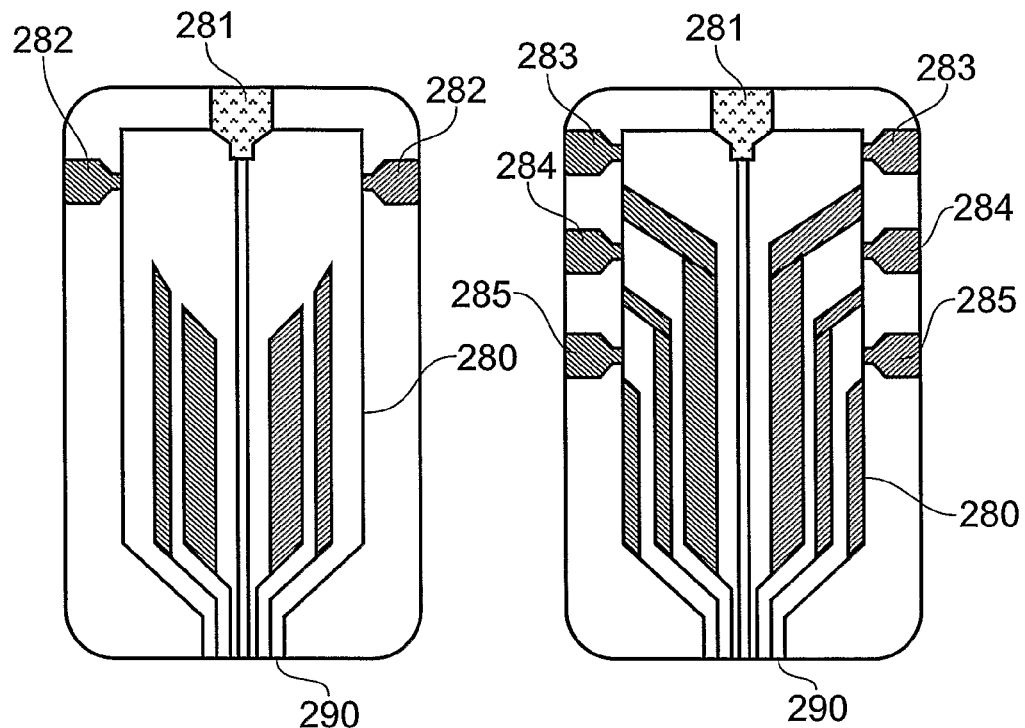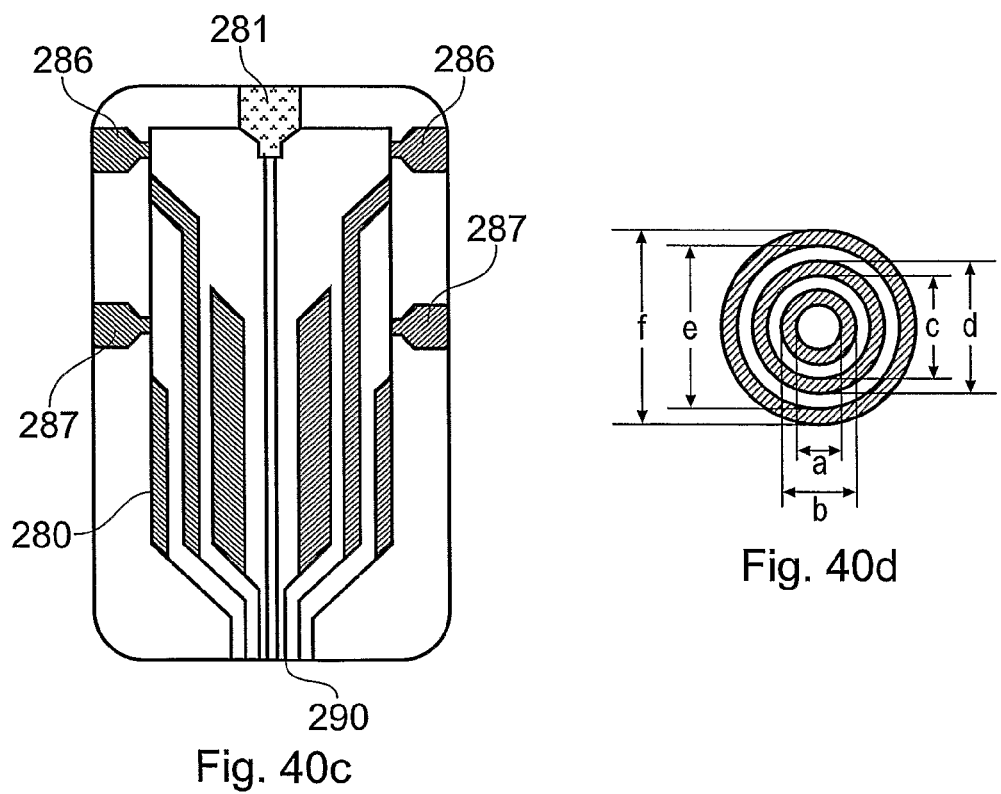
Fig. 40a
Fig. 40b
Fig. 40c
Fig. 40d (1)　　　　　(2)　　　　　(3)

(1)　　　　　(2)　　　　　(3)

(1)　　　　　(2)　　　　　(3)

HOLLOW FIBRES

CROSS REFERENCE TO RELATED PATENT APPLICATIONS

The present application is a U.S. National Stage filing of Patent Cooperation Treaty ("PCT") application Ser. No. PCT/GB2006/002509, filed Jul. 7, 2006, which in turn claims priority to GB Patent Application Ser. No. 0514026.1, filed Jul. 8, 2005 and GB Patent Application Ser. No. 0516804.2, filed Aug. 16, 2005, all of which are hereby incorporated by reference herein in their entireties. PCT/GB2006/002509 was published in English under PCT Article 21(2) as WO/2007/007051 on Jan. 18, 2007.

BACKGROUND OF THE INVENTION

The present invention is directed towards the preparation of hollow fibres, in particular fibres of nanoporosity without additional coating and a new generic synthesis route for the production of a range of hollow fibres with specific properties.

SUMMARY OF THE INVENTION

The range of compact hollow fibres provided by the present invention is very useful to many process industries. The development of porous layers (or membranes), low pressure drop adsorbent fibre module and membrane technology (with a high surface area and low cost) is an important element of the introduction of new energy saving and environmentally friendly technologies all over the world. For example, such technology is applicable for valuable material recovery and recycling, pollution control, wastewater treatment, as substrate for other selective layers and recovery of material from waste gases.

The hollow fibres according to the present invention can be prepared economically with widely varying physical configurations while utilizing many types of inorganic materials. Furthermore, it has been found that large amounts of these fibres can be produced with only nominal losses due to flaws and imperfections due to the method of production.

The hollow fibres produced by the process of this invention comprise essentially inorganic materials which are sintered to form uniform pore hollow tube form fibre. The sinterable inorganic materials comprise a very large group of materials. The preferred sinterable inorganic materials are metals or adsorbents. Nickel, iron and their alloys are particularly useful. The sinterable inorganic materials can be ceramics, such as aluminium oxide, bentonite, or mixtures, such as iron metal/aluminium oxide, titanium carbide/nickel, etc. An extremely important contribution of the present invention is the ability to produce defect free, compact fibres with narrow pore range in the inside and outside dense skin layer. It is therefore a first object of the present invention to prepare hollow fibres with a narrow pore range and a very small pore size.

Currently separation/recovery systems use granules, membrane tubes and ceramic monoliths which can be easily damaged and are expensive to replace—therefore more low cost, high surface area, robust, flexible, fibres with thin separation layers are required. Membrane thickness is an industrially important property because the thickness of a porous layer can affect flux and selectivity. It is therefore an object of the present invention to prepare fibres with good filtration properties with various pore sizes; adsorption capacity, kinetic properties and good mechanical strength. A further object of the present invention is to prepare inorganic/ceramic fibres with increased flexibility when compared with fibres of the prior art which are brittle and easily broken.

Porous layers can also be impregnated with adsorbents to tailor the functionality of the fibres. The present invention is therefore also directed towards the preparation of silicalite or zeolite hollow fibres and hollow fibres with specific functionality. These fibres may be inorganic or ceramic fibres or they may be polymeric fibres including the functional adsorbent.

The current synthesis routes often include impregnation of precursors or the use of chemicals for zeolite deposition. This is both time consuming and expensive. An object of the present invention is therefore to provide a synthesis route for producing defect free compact fibres, which is simple and in which production times and costs are dramatically reduced.

Certain types of dense polymeric membranes or porous layers offer good potential for selective VOC (Volatile Organic Compounds) removal using vapour permeation or pervaporation processes due to their high permeability. However, current limitations arise from their limited selectivities for organics over air or water and low flux. The addition of an adsorptive filler to the polymeric membrane has been demonstrated to be an effective way to improve membrane performance by enhancing membrane sorption capacity for one or more of the compounds to be separated. WO2004/003268A1 discloses such a process.

In order for porous fibre to be an effective separator, the layers should have high composition of adsorbent materials—65-85% is typical in commercially available adsorbent pellets. At higher compositions a dense skin is not fully formed and fibres tend to have slight defects or pin holes and this tends to give high fluxes. Adsorbents in the matrix are therefore not fully utilised and this is inefficient and consequently expensive.

The application of zeolite-filled membranes for vapour permeation in VOC control processes is an example of such an addition. In view of the solution-diffusion mechanism for molecular transport, ideal fillers for preparation of VOC-selective polymer membranes should have hydrophobicity and high sorption capacity for organic compounds and fast diffusion of the organic molecules within the adsorbent filler. An ideal candidate for this task would be high silica zeolite. Zeolites can be used as adsorptive fillers for many separations for improving membrane properties because of their unique crystalline microporous structure, surface chemistry, thermal and mechanical strength. Many other adsorbents such as silica and MCMs could be incorporated into the structure depending on the final properties which are desired.

Zeolite particles were embedded in an inorganic or polymeric matrix/membrane to change the transport properties of the membrane. The selectivity performance of the zeolite-filled membranes was improved compared with the unfilled membrane. The results suggested that the higher the percentage of silicalite in the structure the better the performance.

Therefore an aim of the present invention is to develop defect free hollow fibres with a high percentage of adsorbent materials with polymer or with binder.

Silicalite-filled poly[dimethylsiloxane] (PDMS) membranes were first applied for the combined pervaporation and fermentation of alcohol-water mixtures in a membrane bioreactor. Both selectivity and permeability of silicone rubber membranes were enhanced by the incorporation of silicalite during pervaporation of ethanol/water mixtures. This was due to the lower water sorption capacity of silicalite. Also, the alcohol could diffuse through both the zeolite and polymer phases, while water had to follow a more tortuous path due to the hydrophobicity of silicalite.

Zeolites have been used mainly in large scale adsorption and catalytic processes in pellet form. The use of adsorbents in hollow fibre form is rare. Membrane tubes with zeolite layers used for VOC control generally have a ratio of membrane area-to-volume of 30-250 $m^2/m^3$. Higher surface area to volume ratios would result in more efficient recovery and it is therefore an aim of the present invention to develop adsorbent hollow fibres suitable for removing VOCs.

DISCLOSURE OF THE INVENTION

According to a first aspect of the present invention, there is provided a hollow fibre in which the mean pore size in one or more layers is less than 100 µm. Such fibres can be produced economically and reliably ie without defects, and are useful to a range of process industries where fibres with a small pore size are required. The mean pore size is preferably controlled to be in the claimed range in the outer surface and this may optionally be less than 50 µm, 10 µm, 1 µm, 100 nm or even less than 10 nm. The porosity may be even throughout the complete fibre or may vary across the fibre. In some cases there will be different porosities across the cross section of the fibre. In particular, there may be a higher porosity towards the centre of the fibre. It is in the outer surface of the fibre that the mean porosity must be controlled to provide the strength of fibre aligned with the filtration properties desired.

The fibre may be an inorganic fibre which comprises an inorganic powder and a binder. The fibre may also include additional components to introduce specific functionality or properties into the fibre. The inorganic powder may be selected from the group consisting of metals, ceramics, adsorbents and ion exchange resins. The metal may be selected from nickel, iron or platinum or an alloy containing nickel, iron or platinum. The ceramic may be selected from the group consisting of aluminium oxide, bentonite, silica, hydroxyapatite or mixtures thereof. The inorganic powder may be a combination of metal and ceramic selected from the group consisting of iron metal/aluminium oxide and titanium carbide/nickel. The binder may be selected from lead bisilicate frit, fine standard borax frit, bentonite and Hyplas. The hollow fibre may additionally further comprises a component selected from fumed silica, magnesium oxide, high silica silicalite, zircon opaque, hydroxyapatite, high silica zeolite and silicalite, and combinations thereof. The hollow fibre may additionally comprise an adsorbent material, for example a zeolite, and in particular a high silica zeolite. The inorganic hollow fibre may have a flexibility of greater than 5° bending angle from the mid point of the fibre. Optionally the bending angle is greater than 10°, 15° or greater than 20° or 30°. A preferred range for the bending angle is 20-30°. The bending angle of fibres produced according to the present invention was measured by taking a 20 cm length of the inorganic fibre, mounting this on two rods, one at each end, and one of the rods was moved downwards at a speed of 2 cm/min until the fibre snapped. The angle of flex (bending angle) was then measured between the mid point of the fibre in the horizontal position to the end point where the fibre snapped.

The fibre may be an organic or polymeric fibre comprising a polymer, a binder and an adsorbent material. The fibre may include additional components to introduce specific functionality or properties into the fibre. The polymer may be selected from the group consisting of PESF, polysulfone, polyvinylidenefluoride (PVDF)), polyethylene, polypropylene, poly(phenylene oxide), polyacrylonitrile, polymethylmethacrylate, poly(vinyl chloride), Polysulfone, Poly(ether sulfone), Poly(vinylidene fluoride), Polyacrylonitrile, Cellulose acetate, Polymide Poly(ether imide), Polyamide (aromatic), Polyimide, Poly(ether imide) and poly(vinyl alcohol) co-polymers of Polylactide (PLA) and Polyglycolide (PGA), Polycaprolactone (PCL) and Poly (ethylene terephathalate) (PET). The binder may be selected from lead bisilicate frit, fine standard borax frit, bentonite and Hyplas, The adsorbent may be a zeolite for example a high silica zeolite.

The fibre may have an additional thin outer coating, which may be of the same composition as the rest of the hollow fibre and have a lower mean pore size, or may be of different composition as the rest of the hollow fibre. The outer coating may be selected from a high purity polymer, an inorganic material and an adsorbent pre-cursor.

According to a further aspect of the present invention, there is provided a hollow fibre which has a mechanical strength (load) of greater than 200 g force at a crosshead speed of 1.0 mm/min for sample which has an effective surface porosity of 0.1-0.2 ($\epsilon/q^2$ calculated from Knudsen flow method). Optionally the load at breaking point is greater than 250 g force or greater than 300 g force. A preferred range is 250-800 g, more preferably is 300-700 g force and most preferred 400-650 g. Increased mechanical strength may be obtained by producing multiple layer fibres using novel spinnerets. Particularly preferred are double or triple layer fibres. Double layer fibres are stronger than single layer fibres (see FIG. 40a) and triple layer fibres are mechanically substantially stronger than double layer (the strength is more than double)—see FIG. 40b.

A further advantage to the production of double or triple layer fibres (in addition to the substantially increased mechanical strength) is that the fibres are largely defect free. With two or three layers of the same composition, any defects in one layer are extremely unlikely to be mirrored by a similar defect in the next layer. The net effect is that there are no pin holes in the fibre produced and it can therefore be used as an efficient porous layer or membrane.

Further, it is possible to have different compositions in the two or more layers. It is therefore possible to produce a fibre where each layer is tailored towards a particular property. For example, the inner layer may be of a composition to provide a particular strength to the fibre, but the outer layer may be constructed to have a particularly small pore size for nanofiltration.

According to a further aspect of the present invention, there is provided a porous hollow fibre which has an area to volume ratio greater than 1,000 $m^2/m^3$. The area to volume ratio may be in the range 1,000-10,000 $m^2/m^3$, preferably 1,000-6,000 $m^2/m^3$, and most preferably 2,000-4,000 $m^2/m^3$. Some commercial membrane tubes have a ratio of membrane area-to-volume in the range 30-250 $m^2/m^3$. Multichannel monoliths (130-400 $m^2/m^3$) and honeycomb multichannel monoliths have higher ratios (800 $m^2/m^3$), but higher ratios still can be obtained with the hollow fibres of the present invention (for example, greater than 3,000 $m^2/m^3$).

According to yet another aspect of the present invention, there is provided an adsorbent hollow fibre including a high percentage of adsorbent material. According to one embodiment, there is at least 65% adsorbent material, preferably at least 75% and more preferably at least 80%. The adsorbent material is a silicalite, preferably a zeolite and more preferably a high silica zeolite. Including a zeolite in the composition restricts the operating temperature range for the drying and firing (if present) processes. Zeolites lose their functionality if subjected to temperatures of greater than approximately 750° C.

The fibre may be polymeric or inorganic. If the fibre is polymeric there will be no firing step in the method of the present invention.

According to the present invention the problem with higher compositions of adsorbent materials having adsorbents in the matrix not being utilised has been overcome by passing the slightly heated dope with pressure through the spinneret and also introducing a thin second layer with lower composition of adsorbent in the dope or pure polymer layer.

The adsorptive/separation properties of zeolite, silicalite fibres and their particulate counterparts are good and have been tested in a laboratory-scale flow system using n-butane as the adsorbate. With this new method, low pressure drop devices with unique adsorbent properties and a high surface area per unit volume ratio can be achieved with a range of adsorbents to target a range of pollutants. The proposed method is not limited to particular adsorbent materials, for example silicalite; in principle many adsorbent materials or catalytic or metallic powders may be used. This method can produce a range of adsorbent fibres with low mass transfer resistance.

The fibres of the present invention are advantageous over the prior art fibres for many reasons which will become clear from the subsequent description and examples, but they include the following. The strong multi-layer fibres of the present invention have been produced by a single stage process. This is simpler and cheaper than the prior art processes where single inorganic tube membranes need to be coated with an inorganic material and sintered a number of times to obtained desired pore characteristics. This is expensive.

The outer diameter of the ceramic fibres produced can be 10 μm-2.5 cm depending on the diameter of the spinneret and the number of layers used. Therefore, lightweight and compact membranes could be made using a single hollow fibre or a cluster of narrower fibres as appropriate. The hollow fibres are nanoporous or microporous and can be tailored to exhibit significant gas fluxes, bending strength (flexibility) and bursting pressure (7-15 bar). The properties of the fibre can be tailored to individual situations.

Flexible hollow fibres are much more resistant to stresses caused during installation, operation and service, and because they can be much smaller in diameter and thus the surface area to volume ratio is much larger, bundles of such fibres can process a great deal more gas/liquid than existing tubular membranes (and thus are far more economical).

Existing methods of production cannot be used to produce either (i) flexible materials or (ii) multilayer high-absorbency fibres in one step. Attempts have previously been made to coat the material in a zeolite using hydrothermal synthesis and a sol-gel technique. This is a more complicated and unnecessary extra step which takes two days in an autoclave.

If multiple layers of the same composition are used, a stronger fibre is produced which has fewer or no defects running through the fibre. The technique has increased the skin thickness as well as its porosity hence maintains its effectiveness as a membrane. Double or triple layer fibres have not previously been produced using high adsorbent powder compositions in the dope to achieve defect free polymer/adsorbent fibres. It is difficult to produce pin holes/defect free adsorbent fibres with single layer spinning and furthermore, adsorbent capacity is not be fully utilised and it is difficult to obtain high separation factors using a single layer product. The method and products of the present invention can overcome these problems in a number of ways.

Firstly spinning a double layer fibre with two or three zeolite compositions (inner layer with low zeolite composition and outer layer with higher composition of zeolite to create a dense wall or visa versa). Secondly, during triple layer spinning having a zeolite formation gel sandwiched between two polymer layers followed by hydrothermal synthesis.

Also, spinning dopes with high adsorbent compositions are known to be very difficult to handle. The present invention enables an improved molecular sieving pervaporation membrane at a lower cost. Existing membranes do not have sufficient selectivity towards the desired species to be separated and/or sufficient flux rates.

If different compositions are used for the different layers, then it may be possible to have a selective membrane which can absorb different compounds at different rates. It is also possible to have one layer present for one property (for example, increased strength) and another layer for another property (for example, selectivity towards a particular molecule or compound). According to another aspect of the present invention, there is provided a method for preparing porous hollow fibres, in which a spinning dope is prepared in a viscous or gel form, filtered using a mesh, the dope is degassed in a piston delivery vessel attached to a spinneret, the vessel is pressurised using an inert gas using jets, the dope is extruded through the spinneret to form a fibre precursor, the precursor is washed, dried and optionally fired.

The inorganic hollow fibres formed by the method of the present invention are the result of the controlled solidification process. First a spinning mixture or dope is prepared from a polymer, a solvent, a binder and an inorganic powder. Subsequently, the produced mixture is extruded through a spinneret into a bath of non-solvent. This non-solvent, selected from a number of internal coagulants including tap water, is also introduced through the bore of the spinneret. Exchange of solvent and non-solvent leads to thermodynamic instability of the spinning mixture and induces liquid-liquid demixing. Further exchange leads to solidification of the polymer-rich phase. The precursor is washed and dried to remove any residual solvent and further heated in a monolith to a high temperature (for example, 750° C.) to burn off the polymer from the precursor. The fibre produced by this method comprises the inorganic compound and the binder.

The spinning dope may comprise a polymer, a solvent and a binder. The polymer may be selected from the group consisting PESF, polysulfone, polyvinylidenefluoride (PVDF)), polyethylene, polypropylene, poly(phenylene oxide), polyacrylonitrile, polymetbylmethacrylate, poly(vinyl chloride), Polysulfone, Poly(ether sulfone), Poly(vinylidene fluoride), Polyacrylonitrile, Cellulose acetate, Polymide Poly(ether imide), Polyamide (aromatic), Polyimide, Poly(ether imide) and poly(vinyl alcohol) co-polymers of Polylactide (PLA) and Polyglycolide (PGA), Polycaprolactone (PCL) and Poly (ethylene terephathalate) (PET). The solvent may be selected from the group consisting of N, N-dimethylacetamide (DMAc), 1-methyl 1-2-pyrrolidone (NMP), N-dimethylformamide (DMF), Acetone, Dioxan, Tetrahydrofuran (THF), Acetic acid (Hac), Dimethylsulfoxide (DMSO), Formylpiperidine (FP), Morpholine (MP) and 4-butyrolactone. The binder may be selected from the group consisting of lead bisilicate frit, fine standard borax flit, bentonite and Hyplas.

The spinning dope may additionally comprise an inorganic powder. The inorganic powder may be selected from the group consisting of metals, ceramics, adsorbents and ion exchange resins. The metal may be nickel, iron or platinum or an alloy containing nickel, iron or platinum. The ceramic may be selected from the group consisting of aluminium oxide, bentonite, silica, hydroxyapatite or mixtures thereof. The inorganic powder may be a combination of metal and ceramic selected from the group consisting of iron metal/aluminium oxide and titanium carbide/nickel. The hollow fibre may additionally comprise a component selected from finned silica, magnesium oxide, high silica silicalite, zircon opaque, hydroxyapatite, zeolite and silicalite, and combinations thereof.

The spinning dope may additionally comprise an adsorbent which may be a zeolite, for example a high silica zeolite. Two or more spinning dopes may be delivered to a spinneret via one or more piston delivery vessels. The two or more compositions may be the same or different, and the different compositions may have different functionality.

The produced compact fibres show very good quality and may have different porosities across the cross section of the fibre with a preferred total porosity in the range 30-55%, in particular 35-45%. Average pore size and effective surface porosity of the hollow fibres can be determined by Knudsen flow method. In one embodiment, the fibres produced have a pore size in the microfiltration (MF) range (10 µm≤pore diameter≤0.1 mm). In another embodiment, the fibres produced have a pore size in the ultrafiltration (UF) range (100 nm≤pore diameter≤1 µm). In a still further embodiment, the fibres produced have a pore size in the nanofiltration (NF) range (pore diameter≤1 nm). It has not been possible to produce inorganic fibres with nanoporosity using the methods of the prior art. The only way that very small pore sizes could be achieved was by means of applying a coating to the fibre which is a very expensive process.

The inorganic fibre may be used as a porous layer or membrane which offers chemical and thermal stability for it to be used in separation processes where organic polymer membranes cannot be used (e.g., at high temperatures in the presence of organic solvents or oxygen). Although tubular inorganic membranes (e.g. ceramic monoliths) could be used, these have some major drawbacks, including: (a) high price; (b) long and complicated production process; and (c) low surface area per unit volume (A/V ratio). The high price is not merely due to the starting materials, but can be attributed to the complicated, time and energy consuming production process, which generally comprises several sequential steps. First a support layer is made to provide mechanical strength to the membrane. Subsequently, on top of this support one or more intermediate layers have to be coated, before the final separation layer can be applied. Each step includes an expensive heat treatment. A reduction of or a combination of steps is desired to cut production time and costs and thereby membrane price. The price could be decreased even further by increasing the A/V ratio of the membranes.

The method of the present invention allows for viscous liquids and gels to be extruded, in contrast to prior art systems where high solids concentration in the spinning dope (i.e. a gel form rather than a liquid) has caused substantial problems in the spinning process. Where products of such processes have been produced they have not had a uniform structure and have been riddled with defects. It has also not been possible to produce nanoporous fibres with pore sizes in the range of 1-20 Å.

According to another aspect of the invention, there is provided a membrane comprising a number of hollow fibres of the present invention. The membrane preferably has a high surface area and may particularly employ adsorbent fibres. Any number of fibres may be used to form the membrane to meet the specific requirements including, for example, a surface area/volume ratio, or physical limitations on where the membrane is to be used.

The membrane may contain at least 5 hollow fibres, for example at least 10 hollow fibres, or at least 20 hollow fibres, or at least 30 hollow fibres, or at least 40 hollow fibres, or at least 50 hollow fibres. The surface area of the membrane may be greater than 80 m2, for example greater than 150 m2, or greater than 300 m2, or greater than 450 m2, or greater than 600 m2, or greater than 800 m2, or greater than 1000 m2. The membrane may be used for pervaporation or liquid or gas separation. The membrane may have a high selectivity for a volatile organic compound (VOC). The water flux rate across the membrane may be 300-800 L/h m2. The hollow fibres may have a high loading of affinity agents, for example the affinity agents may be present in an amount of at least 10% by weight, or at least 15% by weight, or at least 20% by weight, or at least 25% by weight, or at least 30% by weight. The hollow fibres may be arranged in a bundle such that materials pass through the fibres simultaneously.

According to a further aspect of the present invention, there is provided apparatus for the extrusion of a fibre, comprising one or more delivery vessels, a spinneret fed by the delivery vessels, a coagulation bath and a washing bath.

The delivery vessel may be a piston delivery vessel, which may include a plate type piston. The plate type piston may be maintained under pressure by means of jets of inert gas. The pressure exerted on the plate type piston may be greater than 2 bar, for example 4-10 bar.

The apparatus may additionally comprise a monolith, which may have a plurality of channels. The temperature of the monolith may be controlled by means of temperature control means and heating means.

According to a still further aspect of the present invention, there is provided a triple orifice spinneret for the extrusion of a double layer fibre and according to another aspect of the apparatus there is provided a quadruple orifice spinneret for the extrusion of a triple layer fibre. Advantages of fibres produced using this apparatus have been described above and further advantages will become apparent from the discussion of the examples below.

The triple orifice spinneret may comprise a base module, an outer delivery chamber, a secondary delivery chamber and a third delivery chamber. Each layer of pre-cursor may have a diameter of between 0.5 and 2 mm. Each layer of pre-cursor may be a thickness of between 0.5 and 1 mm. The inner layer may have an internal diameter of between 0.1 and 5 mm, or between 0.5 and 3 mm, or between 1 and 2 mm, or between 1.5 and 2 mm. The triple orifice spinneret may have an additional access point on the spinneret for the introduction of an additional outer coating.

The quadruple orifice spinneret may comprise a base module, an outer delivery chamber, a secondary delivery chamber, a third delivery chamber and a fourth delivery chamber. Each layer of pre-cursor may have a diameter of between 0.5 and 2 mm. Each layer of pre-cursor may have a thickness of between 0.5 and 1 mm. The inner layer may have an internal diameter of between 0.1 and 5 mm, or between 0.5 and 3 mm, or between 1 and 2 mm, or between 1.5 and 2 mm. The quadruple orifice spinneret may have an additional access point on the spinneret for the introduction of an additional outer coating.

BRIEF DESCRIPTION OF THE DRAWINGS

The invention may be put into practice in a number of ways and a number of embodiments are shown here by way of example with reference to the following figures, in which:

FIG. 2 is a graph showing a plot of a typical firing temperature programme for ceramic hollow fibres;

FIGS. 3-7 show scanning electron micrographs (SEMs) of the fibres produced by examples 1, 2, 4, 5 and 6 respectively;

FIGS. 9 to 14 show SEMs of the fibres of examples 13 to 18;

FIGS. 18 and 19 are SEMs of Inorganic Adsorbent Hollow Fibres produced according to examples 21 and 24;

FIG. 20 is a collection of SEMs of inorganic adsorbent hollow fibres produced according to example 25, both single and double layer;

FIGS. 21 to 23 are SEMs of inorganic adsorbent hollow fibres produced according to examples 26-28;

FIGS. 27 to 30 show the component parts for a triple orifice spinneret for use in the production of a double layer fibre;

FIG. 40 shows schematically three different designs for producing triple layer fibres using a quadruple orifice spinneret;

DETAILED DESCRIPTION OF THE DRAWINGS

A first aspect of the present invention is directed towards a method of production of hollow fibres. This method may generically be described as follows.

Generic Method for Production of Inorganic Fibres

One or more spinning dopes are prepared depending on whether the fibre is to be a single, double, triple, etc layer fibre. For each spinning dope, a suitable solvent is poured into a 500 ml wide-neck bottle, and the desired quantity of polymer is slowly added. The mixture is stirred with a rotary pump to form a polymer solution and once the polymer solution becomes clear, the desired amount of the very fine ceramic powder is slowly added. The mixture is then stirred with an IKA® WERKE stirrer at a speed of 500-1000 rpm for 2-4 days until the ceramic powder is dispersed uniformly in the polymer solution and from the vigorous stirring the mixture is turned into a gel. The mixture is heated, then filtered through a 100 μm Nylon filter-bag in order to remove any agglomerated or large particles and the mixture is then placed on a rotary pump for 2-4 days to degas and to form a uniform spinning dope.

Figure 1:
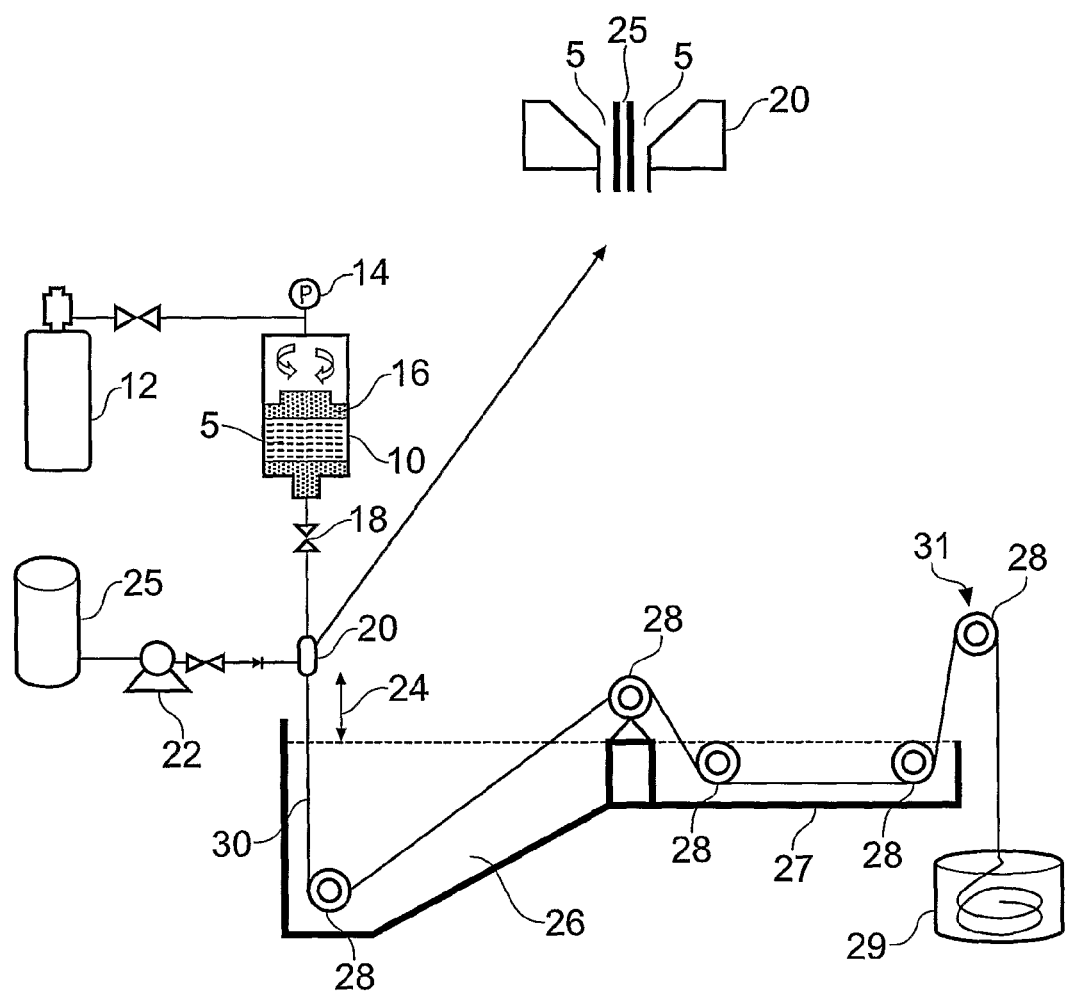
FIG. 1 shows in schematic form the apparatus for the generic spinning procedure according to the present invention.

The fibres are then produced by spinning using an appropriate spinneret followed by heat treatment. Referring to FIG. 1, the mixture 5 is transferred to a stainless steel piston delivery vessel and degassed using a vacuum pump for two hours at room temperature—this ensures that gas bubbles are removed from the viscous polymer dope. The spinning process is then carried out with the following parameters:

1. The heated tank 10 (heating wire around the tank) is pressurised to 4 bar using a nitrogen jet 12 and this is monitored by means of a pressure gauge 14. Release of the dope mixture 5 to the spinneret 20 is controlled by means of a piston 16 and valve 18. The delivery vessel is long and small in diameter to maintain uniform pressure for longer period with in the vessel. The higher the pressure in the tank, and therefore the pressure of the precursor dope passing through the spinneret, the smaller the fibre produced 2. A tube-in-orifice spinneret 20 is used with an orifice diameter of, for example, 2 mm and an inner tube diameter of 0.72 mm, in order to obtain hollow fibre precursors. This double orifice spinneret is for a single layer fibre. For two or more layers, triple or quadruple spinnerets are used and feeds are arranged appropriately. Bore liquid (or the internal coagulant) 25 is also fed to the spinneret 20 and is controlled by means of a gear pump 22. If less bore liquid is pumped through the spinneret the hollow core of the fibre will be smaller and the walls will be thicker. By changing the delivery pressure properties of the fibres could be changed 3. The air gap 24 between the bottom of the spinneret 20 and the top surface of the coagulation bath 26 is typically varied in the range 0-3 cm. Increasing the air gap will cause the outer "skin" of the fibre produced to be more dense whereas a smaller air gap will produce a product with more open layers and the fibre will be more porous.

4. The fibre 30 once extruded from the spinneret is passed over a series of rollers 28 through a washing bath 27 to a fibre storage tank 29.

5. Water is used as the internal and external coagulator for all spinning runs as bore liquid 25 and as bath liquid in water baths 26 and 27. A low concentration of other solvents also could be added to improve precipitation rate e.g. ethanol, methanol, n propanol.

The precursor is run through the water bath 26 to complete the solidification process and then the hollow fibre 30 is washed thoroughly in the second water bath 27. Care must be taken to ensure that the hollow fibre is not subject to mechanical dragging during the spinning process. Continuity in the pressure is important to deliver polymer dope gel as well as uniform delivery of the internal coagulant in order to avoid entrapment of air and separation of the fibre which would otherwise result in unsuccessful spinning. A guide motor 31 helps to control the movement of the fibre through the water baths. The hollow fibre precursors are then left to soak for 3-4 days in fresh water in the fibre storage tank 29 in order to remove any residual solvent. The precursors are then dried in ambient conditions for seven days before firing.

The double orifice spinneret 20 is designed to be able to extrude gel mixtures which have been difficult to handle in the apparatus and processes of the prior art. In particular, in prior art processes, when the solids content of a zeolite fibre has been at a high level (for example 40-50% solids), it has been difficult to extrude a consistent fibre with substantially uniform properties. Using the double orifice spinneret of the present invention, gels with solids contents of, for example 85%, can be handled and the resulting fibre is substantially uniform. As explained in further detail below, the method of the present invention can also be used with triple and quadruple orifice spinnerets which will respectively produce double and triple layer fibres.

The firing preferably takes place in a multichannel monolithic device to provide uniform distribution of heat to the fibres and also to support the fibre along the complete length such that a uniform straight fibre is produced. The monolithic device with the fibres in it is then placed in a CARBOLITE furnace and fired in accordance with the desired heat treatment programme. Typically this may be as follows (and as indicated in FIG. 2):

Increasing the temperature from room temperature to 600° C. at a steady rate of 4° C./min and holding the temperature at 600° C. for 1 hour to remove any water trapped within the pores of the fibre and any organic polymer binder left within the structure of the ceramic hollow fibre. Increasing the temperature of the furnace to 1450° C. in stages. In a first stage the temperature is raised to 900° C. at 3° C./min. Secondly the temperature is increased to 1100° C. at 2.5° C./min and finally the temperature is raised to 1450° C. at a rate of 2° C./min. The temperature is held at 1450° C. for 5-8 hours in order to allow fusion and bonding to occur. The fired product is then allowed to cool to room temperature naturally and the product is ready for use. The final sintering temperature is preferably between 1500-1600° C. The strength of the ceramic fibre produced is increased with temperatures up to 1600° C. However surface porosity is reduced above 1500° C. and there is therefore a trade-off in the properties of the final product. Flux is also reduced when the product is sintered above 1600° C.

EXAMPLES 1 TO 6

Porous Ceramic Hollow Fibres

These fibres are produced according to the generic method described above using the compositions set out in table 1 below.

Table 1 below shows the physical properties of these fibres and FIGS. 3-7 show SEMs of cross sections of fibres from examples 1, 2, 4, 5 and 6 respectively. Table 1 shows it is possible to prepare fibres with a very small pore size and all types of pore membrane from a liquid or from a gel using the method of the present invention. Depending on the pore size of the resulting fibre, it may be suitable for microfiltration, ultrafiltration or nanofiltration as set out above.

FIGS. 3a-3c show defect free micro filtration Alumina fibres (sintered at 1600° C.) with an average pore diameter of 240 nm. Examples 1 and 2 were mainly produced from 1 μm large particles and two different sintering temperatures to make more compact fibres which have a high-flux and are defect free. FIGS. 3(a)-(c) show SEMs of cross-sectional structures of micro filtration fibre sample example 1 after sintering at 1600° C. FIG. 3(a) shows a tubular structure with uniform wall thickness; FIG. 3(b) shows the finger like morphology to minimise the mass transfer resistance, and FIG. 3(c) shows magnification at ×500.

FIGS. 4(a)-(c) show micro filtration fibres (sintered at 1550° C.) prepared according to example 2. Average pore diameter 190 nm. FIG. 4(a) shows a tubular structure with uniform wall thickness at ×85 magnification; FIG. 4(b) shows a more open pore structure to minimize the mass transfer resistance at a magnification of ×430; and FIG. 4(c) magnification at ×1800 showing surface structure.

Figure 5A:
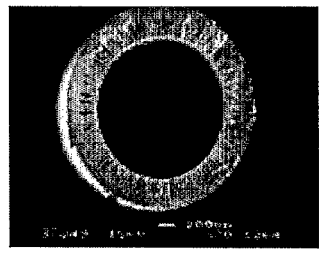
Figure 5B:
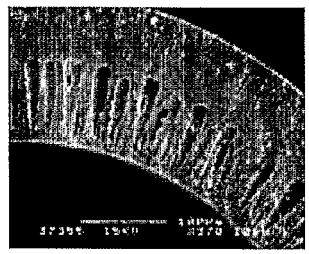
Figure 5C:
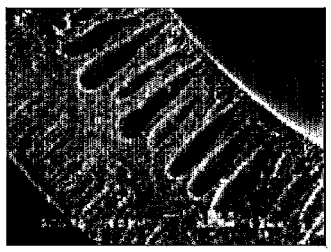
Figure 6A:
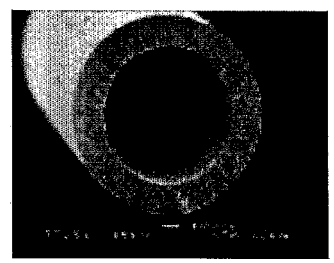
Figure 6B:
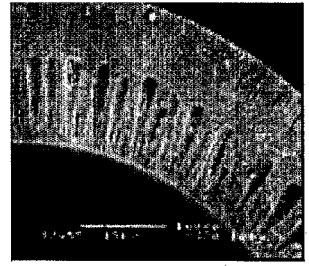

FIGS. 5(a)-(c) show ultra filtration fibres sintered at 1550° C. prepared according to example 4. Average pore diameter 20 nm, effective surface porosity 2780 m$^{-1}$. FIGS. 6(a) and (b) show micro filtration fibres sintered at 1600° C. in accordance with example 5. Average pore diameter 80 nm, effective surface porosity 30 m$^{-1}$. FIG. 6 shows the cross-section of micro filtration fibre produced according to example 5, FIG. 6(a) showing tubular structure with uniform wall thickness at ×70 magnification and 6(b)×370 magnification.

Figure 7A:
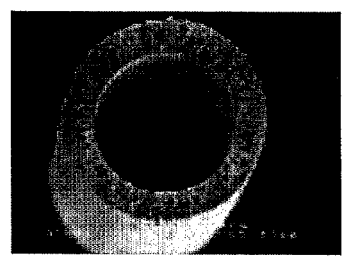
Figure 7B:
Figure 7C:

FIGS. 7(a)-(c) show two layer dense micro filtration fibres sintered at 1550° C. Average pore diameter 20 nm.

TABLE 1

| Example No. | NMP/Pesf | $Al_2O_3$/Pesf | $Al_2O_3$ powder used 1/0.3/0.01-0.02 (μm) | Viscosity (Pa·s) | Sintering Temperature (° C.) | Fiber OD/ID (mm) | Gas permeability (molm$^{-2}$ Pa$^{-1}$ s$^{-1}$) (N2, 1.01325 × 10$^5$ Pa (1 atm)) | Average pore diameter (nm) | Water Flux kg m$^{-2}$h$^{-1}$ by 50 L vacuum |
|---|---|---|---|---|---|---|---|---|---|
| 1 (1600° C.) (MF) | 4/1 | 5.5/1 | 97 g/0/3 g | 6.9E+0 | 1600 | 1.2/0.9 | 1.24 × 10$^{-5}$ | 240 | 614 |
| 2 (1550° C.)) (MF) | 4/1 | 5.5/1 | 97 g/0/3 g | 6.9E+0 | 1550 | 1.2/0.9 | 9.36 × 10$^{-5}$ | 109 | 356 |
| 3 (1450° C.)) (MF) | 4/1 | 5.5/1 | 97 g/0/3 g | 6.9E+0 | 1450 | 1.2/0.9 | 12.36 × 10$^{-5}$ | 155 | 440 |
| 4 (1550° C.)) (UF) | 5/1 | 5/1 | 0/80 g/20 g | 8.96E+0 | 1550 | 1.1/0.8 | 1.76 × 10$^{-5}$ | 20-40 | 46 |
| 5 1600° C.) (MF/UF) | 4/1 | 5/1 | 50 g/30 g/20 g | 12.9E+0 | 1600 | 1.2/0.9 | 3.78 × 10$^{-6}$ | 80 | 95 |

TABLE 1-continued

| Example No. | NMP/Pesf | Al$_2$O$_3$/Pesf | Al$_2$O$_3$ powder used 1/0.3/0.01-0.02 (μm) | Viscosity (Pa·s) | Sintering Temperature (°C.) | Fiber OD/ID (mm) | Gas permeability (molm$^{-2}$ Pa$^{-1}$ s$^{-1}$) (N2, 1.01325 × 10$^5$ Pa (1 atm)) | Average pore diameter (nm) | Water Flux kg m$^{-2}$h$^{-1}$ by 50 L vacuum |
|---|---|---|---|---|---|---|---|---|---|
| 6 | 4.5/1 | 5/1 | 65 g/20 g/15 g | 10.6E+0 | 1550 | 1.3/0.8 | 5.01 × 10$^{-7}$ | 6 | 564 |
| Two layer (UF) | 6/1 | 2.4/1 | 0/15 g/85 g | 16.6E+0 | | | | | |

It has been found that the finer the powder in the pre-cursor, the more the polymer dope takes on a gel nature. A viscosity less than 7 Pa·s, polymer/powder dope is considered to be a liquid and viscosity greater than 7 it is considered to be a gel. With 1 μm particles, at higher temperature (1550 or 1600° C.) the stronger the fibre and good water flux. With fine powder (0.01 μm) strong fibres could be produced at lower temperature (1450° C.) which saves energy—produces finer pore, high porosity, very good water flux.

EXAMPLES 7 TO 12

Flexible, Porous Ceramic Hollow Fibres

These fibres are produced according to the generic method described above with the following differences.
1. The organic solvent used is 1-methyl-2-pyrrolidone (NMP) (99+% Spectrophotometric Grade). The polymer used is polyethersulfone (PESF) or polysulfone. The ceramic used is commercially available aluminium oxide powder with a particle diameter of 0.01-1 μm (a surface area 10 m$^2$/g).
2. For micropores to be formed (10-100 μm pore sizes), a high percentage of fine ceramic powder (0.01 μm) was required in the spinning dope to produce the small pores in the fibres. Flexible fibres could be made with large particles as well, but small particles (0.01 μm) are essential for small pores. The use of such small particles turns the dope into a gel. Such gels are very difficult to spin, hence prior art systems have previously only used larger particles to avoid gel formation—and thus only large pore sizes have previously been made. An additional thin layer of alumina sole has to be deposited on the macropore support to produced fine pore membranes.
3. After the ceramic power was dispersed (i.e., before the filtration step in the preparation of the spinning dope) fumed silica (99.8% pure) and/or magnesium oxide and/or high silica zeolite (30% w/w) is slowly added to the mixture—this is what subsequently provides the flexibility in the fibres. Also adding lead bisilicate frit or fine standard borax frit to the dope adds flexibility in the fibres. Standard alumina hollow fibres produced by prior art methods are very rigid and hence can easily break or damage during transport, assembly of the process equipment, or operation.
4. During the filtration step the dope was heated slightly.
5. Distilled water was used as the internal coagulant and tap water as the external coagulant rather than tap water being used for both coagulants.

Table 2 sets out details of precursor mixture compositions and fibre spinning conditions and results obtained during flexibility studies for examples 7 to 12.

TABLE 2

| Example No. | NMP/PESF (wt %) | Al$_2$O$_3$/PESF (wt %) | Al$_2$O$_3$ powder used (wt %) 1/0.3/0.01-0.02 (μm) | Additive to create Flexibility | Degree of flexibility: Bending angle from mid point of the fibre (Horizontal) | Pore size (nm) | Spinning parameters | |
|---|---|---|---|---|---|---|---|---|
| 7 | 6/1 | 4.2/1 | 100 g/0/0 | 14 g Fumed silica | 20° | 90 | Coagulation bath temperature (° C.) | 15-20 |
| 8 | 5/1 | 3.6/1 | 100 g/0/0 | 9 g fumed silica 4.5 g magnesia | 19° | 88 | Internal coagulant (ml/min) Nitrogen pressure (bar) Air gap (cm) | 6-8 3-6 0-3 |
| 9 | 6/1 | 6/1 | 0/80 g/20 g | 11 g fumed silica 4.5 g magnesia | 26° | 20 | Linear extrusion speed (rpm) Bore liquid water | 46 |
| 10 | 5/1 | 4.9/1 | 0/85 g/15 g | 9 g fumed silica 4.5 g magnesia | 25° | 8 | External coagulant water | |
| 11 | 4/1 | 5.5/1 | 97 g/0/3 g | Lead bisilicate frit | 30° | 200 | | |
| 12 | 4/1 | 5.5/1 | 0/75 g/25 g | 25 g silicalite | 25° | 6 | | |

The fibres were flexible but maintained good tensile strength. The flexibility was measured by taking 20 cm length of inorganic fibre, mounted on two rods and one of the rods was moved downwards at 2 cm/min speed until the fibre snapped. Then the angle of flex was measured between mid point of the fibre (from horizontal) to the distance travel before it was snapped.

EXAMPLES

Double and Triple Layer Hollow Fibres

These fibres are produced according to the method described in examples 1 to 3 above for each layer required with the compositions varying as appropriate.

Figure 8:
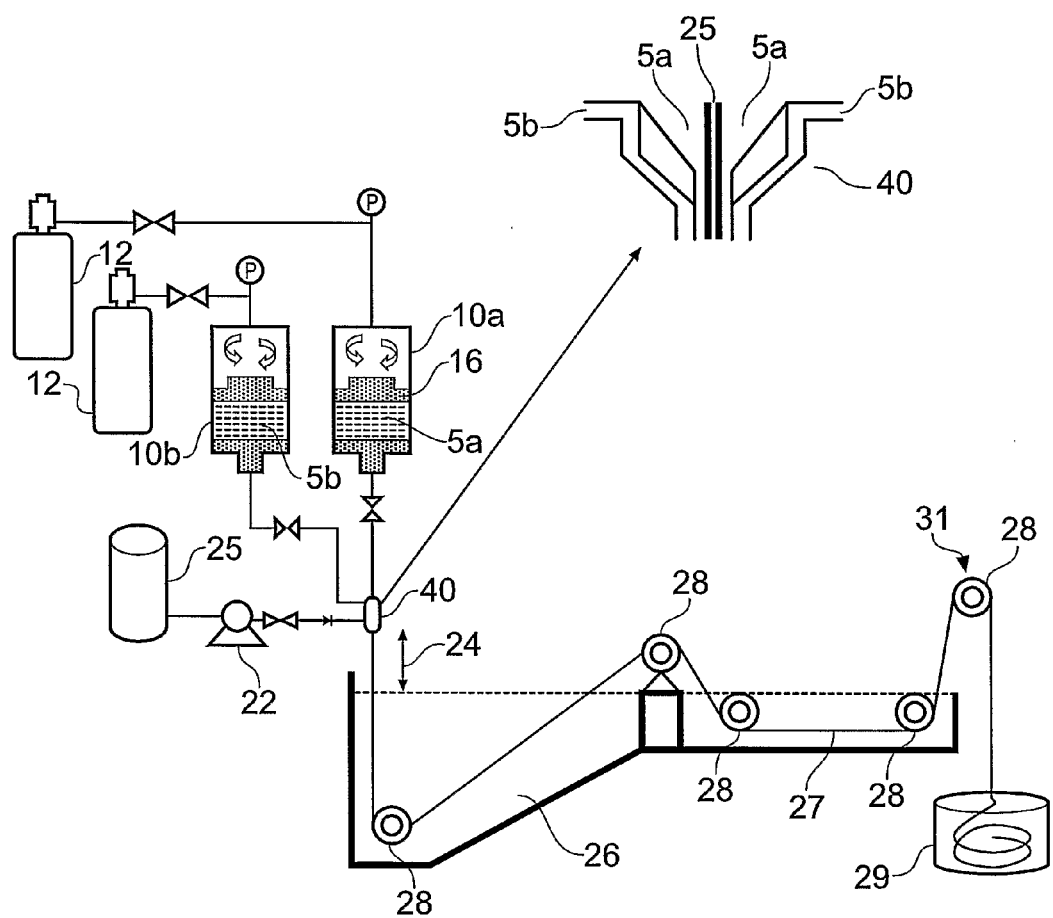
FIG. 8 shows in schematic form the apparatus for the generic spinning procedure for a double layer fibre according to another aspect of the present invention.
Figure 9:
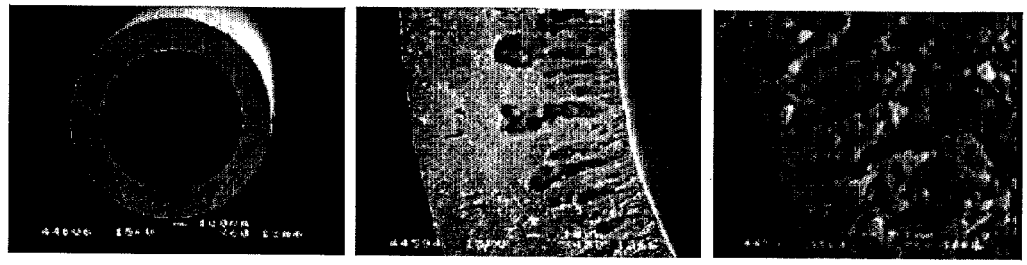
Figure 10:
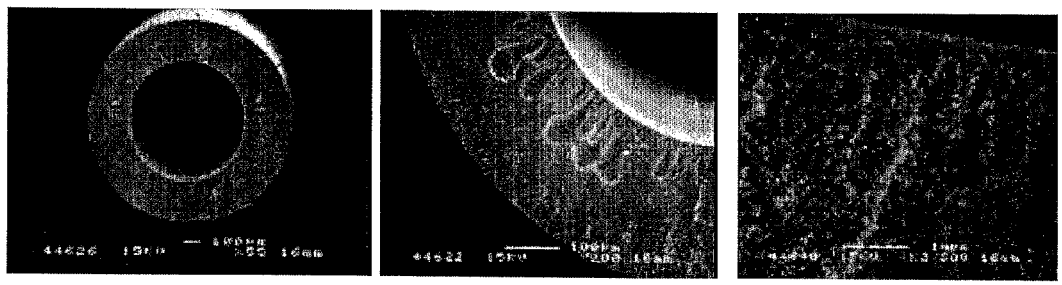
Figure 11:
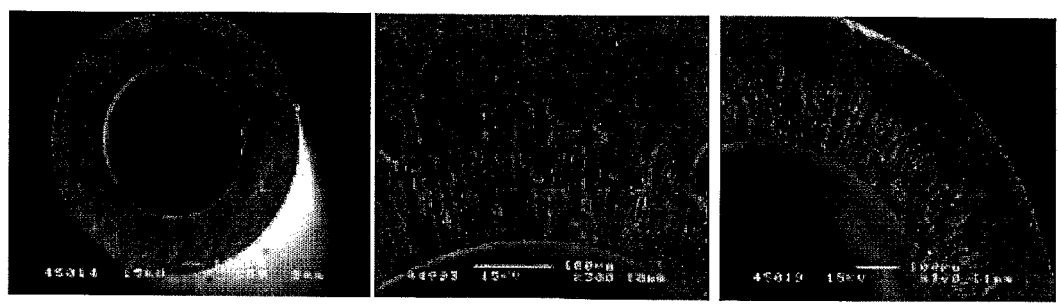

Apparatus as set out in FIG. 8 was used to form double layer fibres. The apparatus includes a triple orifice spinneret and two solution feeds. Typical dimensions of the triple orifice spinneret are external layer ($d_{out}$ 4.0 mm, $d_{in}$ 3.0 mm), internal layer ($d_{out}$ 2.0 mm, $d_{in}$ 1.2 mm), and bore ($d_{out}$ 0.8 mm). Triple and quadruple orifice spinnerets for use in the production of double or triple layer fibres are described in further detail below. For a triple layer fibre, apparatus similar to that shown in FIG. 8 is used but there will be an additional third solution feed for the third layer.

Examples of fibre spinning conditions and precursor mixture compositions used are given below.

For spinning, two delivery vessels 10a, 10b (or more as may be required) are prepared, one pressurised to 2 bar using nitrogen 12, and the other delivery vessel is further pressurised to 2.5-4 bar using a nitrogen jet. In order to maintain uniform pressures to piston delivery vessel pressure controllers were used. These provide gel feeds 5a and 5b to the triple orifice spinneret with the feed 5a providing the inner layer of the fibre and feed 5b providing the outer layer. For firing the double layer fibres produced, the heating program set out in FIG. 2 was employed.

The fibres produced by this method may have two or more layers. This method has the advantage of reduced production costs when compared to prior art methods and also enables the introduction of layers with different functional properties and mixed matrix compositions.

EXAMPLES 13 TO 18

Ceramic Double Layer Hollow Fibre Membranes

Table 3 below shows the compositions for examples 13-18 together with the properties of the ceramic double layer hollow fibre membranes produced. Examples 13 and 14 are double layer with same composition and are included as they form the basis for the double layer different composition fibres of examples 15-18.

FIGS. 9 to 14 show SEMs of the fibres of examples 13 to 18. In FIGS. 13(a)-(c) and 14(a)-(c), the SEMs show the cross-sectional structures of example 17 and 18 respectively made from high composition of 0.02-0.01 μm alumina powder after sintering. These fibres have pore sizes of 1.7 and 2.6 nm respectively (see Table 3). The fibres are compact and defect free. FIGS. 13(a) hollow fibre with uniform wall thickness; (b) and (c) finer pore structure. FIGS. 14(a)-(c) show Scanning Electron Micrographs of example 18 after sintering at 1450° C.; (a) Thick wall hollow fibre with uniform wall thickness of 300 μm; (b) showing pore structure and (c) wall of the fibres with finger like macro voids.

Examples 15 and 16 are double layer fibres comprising the compositions of example 13 as the inner layer and example 14 as the outer layer. The fibres of Example 16 were sintered at 1450° C. while in Example 15 they were sintered at 1470° C.

EXAMPLES 19 AND 20

Triple Layer Fibres

Triple layer fibre production was with a specifically designed spinneret adapted to extrude high powder compositions in the spinning dopes (see FIGS. 31 to 40).

Two spinneret designs were used for three layer spinning. In a first design one piston delivery vessel could be used for feeding through the spinneret to all annular channels surrounding the bore fluid stream for each hollow fibre layer. The delivery pressure was maintained at 4 bar using pressure controllers. The resulting product had three layers of the same composition. This ensured that there were no defects in the fibre produced, and in particular no pin holes or windows in the fibre through which gases or liquid could pass without being separated. The fibre was also stronger than a single or double layer fibre of the same composition would be. The thickness of the separation layer, depending on delivery pressure, was found to have 1-2 nm pores. Also the novel quadruple orifice, triple layer spinneret has been design to accommodate introduction of a thin layer of functional materials or adsorbent precursor or catalytic layer in to the outer layer (through the outer annular channel.

TABLE 3

| Example No. | Fibre OD/ID (mm) | $Al_2O_3$/PESF (wt %) | $Al_2O_3$ powder used 1/0.3/0.01-0.02 (μm) | Average pore diameter (nm) | Gas permeability (molm$^{-2}$ Pa$^{-1}$ s$^{-1}$) (N2, 1.01325 × 10$^5$ Pa (1 atm)) | Water flux (L/hr · m$^2$) Vacuum pump: 10 L/min | Inner layer viscosity (Pa · s) Outer layer viscosity (Pa s) | Water flux (kg/hr · m$^2$) pump: 50 L/min |
|---|---|---|---|---|---|---|---|---|
| 13 (1500° C.) | 1.27/0.9 | 4/1 | 75/22/3 75/22/3 | 109.5 | 2.85 × 10$^{-5}$ | 321.4 | 4.74E+0 4.74E+0 | 615 |
| 14 (1450° C.) | 1.2/0.77 | 5/1 | 0/85 g/15 g 0/85 g/15 g | 1.5 | 2.55 × 10$^{-5}$ | 340 | 10.9E+0 10.9E+0 | 930 |
| 15 (1470° C.) two layer | 1.38/0.9 | 4/1 5/1 | 75/22/3 0/85 g/15 g | 113 | 1.56 × 10$^{-5}$ | 200.8 | 4.74E+0 10.6E+0 | 798 |
| 16 (1450° C.) | 1.43/0.95 | 4/1 5/1 | 75/22/3 0/85 g/15 g | 10.3 | 2.61 × 10$^{-5}$ | 296.43 | 4.74E+0 10.6E+0 | 859 |
| 17 (1500° C.) (NF) | 1.2/0.6 | 5.5/1 5.6/1 | 0/75 g/25 g 0/60 g/40 g | 1.7 | 4.56 × 10$^{-6}$ | 328 | 11.6E+0 14.6E+0 | 910 |
| 18 (1450° C., | 1.18/0.9 | 5/1 4/1 | 0/70 g/30 g 0/50/50 | 2.6 | 1.78 × 10$^{-5}$ | 360 | 12.6E+0 15.6E+0 | 860 |

In a second design, spinning dope for each layer needed to be delivered to the spinneret separately using three pressurised piston delivery vessels. For spinning, three delivery vessels are prepared, one pressurised to 2 bar using nitrogen, and two other delivery vessels further pressurised to 2.5-4 bar (middle layer) and 5-6 bar respectively (3$^{rd}$ delivery vessel for outer layer) using nitrogen jets. In order to maintain uniform pressures to the piston delivery vessel pressure controllers were used.

A quadruple orifice spinneret (see FIGS. 26 to 32) is employed with typical specifications ($d_{out}/d_{in}$) of 5 mm/4 mm for the outer layer and 3.5 mm/2.5 mm for the intermediate layer and 2 mm/1.1 mm for the internal layer. A bore diameter of 0.8 mm was used to obtain the hollow fibre precursors.

These fibres are produced according to the method described in examples 1 to 3 above for each layer required with the compositions varying as appropriate and set out in examples 13 and 14 above. Table 4 shows compositions and properties of two triple-layer fibres.

rich), DMF—(60 g for both NMP, DMF combined). The polymer used is Polyethersulfone (PESF) or Polysulfone (PSF) (Radel A-300, Ameco Performance, USA)—(10.5 g).

2. A binding agent is added after the polymer solution becomes clear—for example, soft borax frit or lead bisilicate frit. Generally 25% w/w of binder is added but it could be 15% binder 85% adsorbents) The mixture is stirred for approximately 2 days before 200 mesh silicalite powder (HISIV 3000-purchased from UOP) is then added through a 300 nm British Standards mesh. A further one to two days of stirring is then required to achieve a homogeneous mixture.

TABLE 4

| Ex. No. | NMP/PESF (wt %) | Al$_2$O$_3$/PESF (wt %) | Al$_2$O$_3$ powder used 1/0.3/0.01-0.02 (μm) | Sintering Temp (° C.) | Spinning parameters | |
|---|---|---|---|---|---|---|
| 19 | | Internal dope | | 1450 | Coagulation bath temperature (° C.) | 20 |
| | 5/1 | 4.9/1 | 0/84.7/15.3 | | Injection rate of internal coagulant (ml/min) | 8 |
| | | Middle layer dope | | | Nitrogen pressure (bar)(Middle) | 2.5-4 |
| | 5/1 | 5/1 | 0/85/15 | | Air gap (cm) | 0-3 |
| | | External dope | | | Linear extrusion speed (rpm) | 48 |
| | 5/1 | 5/1 | 0/85/15 | | Bore liquid (6 ml/min) | water |
| | | | | | External coagulant | water |
| | | | | | Viscosity Pa · s | 12-13E+0 |
| 20 | | Internal dope | | 1450 | Coagulation bath temperature (° C.) | 20 |
| | 5/1 | 4.9/1 | 0/85/15 | | Injection rate of internal coagulant (ml/min) | 8 |
| | | Middle layer dope | | | Nitrogen pressure (bar)(Internal) | 2-3 |
| | 5/1 | 4.9/1 | 0/85/15 | | Nitrogen pressure (bar)(Middle) | 4-5 |
| | | External dope | | | Nitrogen pressure (bar)(External) | 3 |
| | 4/1 | 5.7/1 | 97/0/3 | | Air gap (cm) | 0-3 |
| | | | | | Linear extrusion speed (rpm) | 48 |
| | | | | | Bore liquid | water |
| | | | | | External coagulant | water |
| | | | | | Viscosity Pa · s (Internal and middle) | 12-13E+0 |
| | | | | | Viscosity Pa · s (External) | 7-10E+0 |

Figure 15:
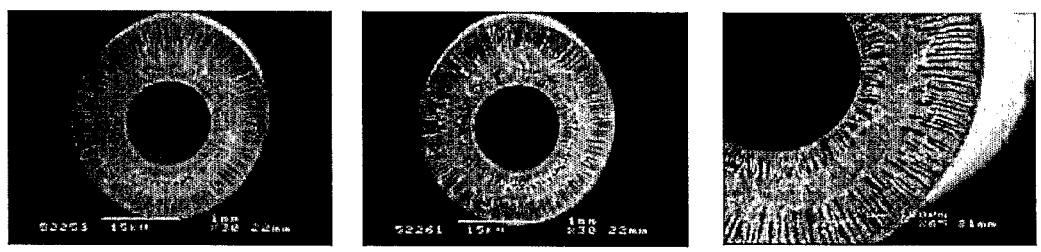
FIGS. 15 and 16 show SEMs of the fibres of examples 19 and 20.
Figure 16:
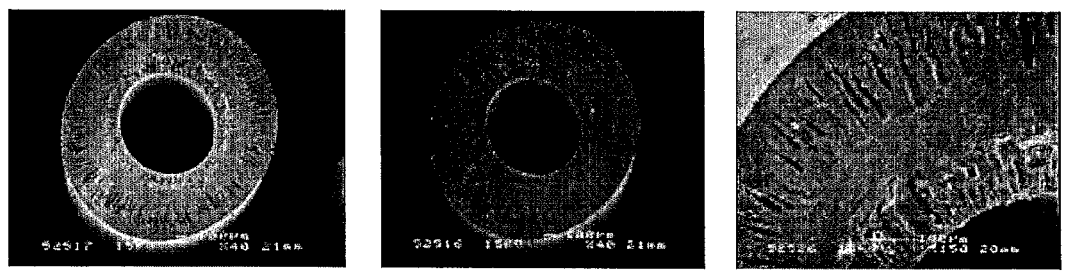

FIGS. 15 and 16 show SEMs of triple layer fibres produced according to examples 19 and 20. FIG. 15 gives a triple layer fibre with the same composition. It can be seen that there is a dense separative layer with fine pores in the middle and long finger like macrovoids formed in the outer layer. In the external coating fibre (FIG. 16) the different layers can be clearly seen but with a very dense outer layer. With triple layer fibres it is therefore possible to produce strong fibres with substantially increased mechanical strength. The fibres are also defect free and very fine pore sizes can be produced. Additional functionality could be introduced into the fibre, in particular in the outer layer.

EXAMPLES 21 TO 25

Inorganic Adsorbent Hollow Fibres

These fibres are produced according to the generic method described above with the following differences. These changes apply equally to single layer and multiple layer fibres.

Figure 17:
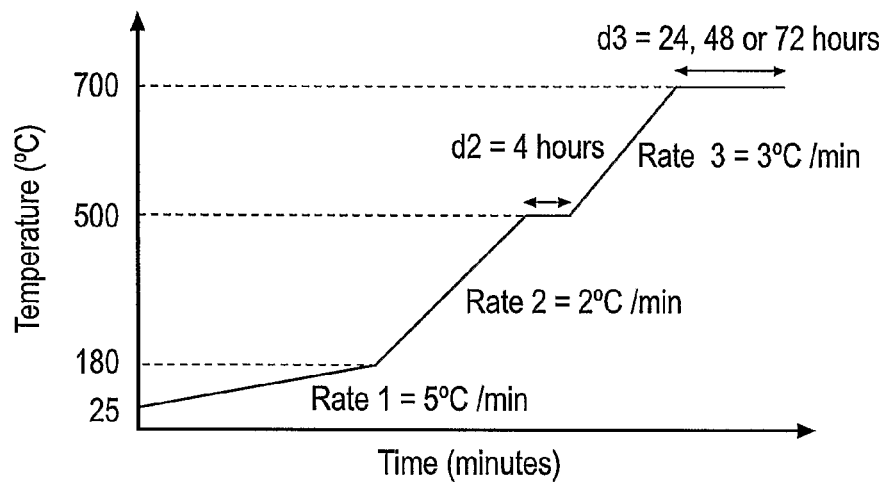
FIG. 17 is a graph showing a plot of a firing temperature programme for ceramic hollow fibres including zeolitic materials in the precursors.

1. The organic solvent used is 1-methyl-2-pyrrolidone (NMP) (99+% Spectrophotometric Grade, Merck) or N,N-Dimethylformamide (DMF) (99.8%, A.C.S., Reagent, Ald- 3. The mixture was filtered through 100 μm filter bag in place of the filtering in step 1e of the generic procedure.
4. The presence of zeolitic materials in the hollow fibre precursors, prevents the use of heat treatment above 760° C.—their adsorbency/molecular sieving properties would reduce. Therefore, the temperature program shown in FIG. 17 was used. The temperature is increased from room temperature to 180° C. at a steady rate of 5° C./min and then raised to 500° C. at 2° C./min. The temperature is held at 500° C. for 4 hours and then the temperature is increased to 750° C. at a rate of 3° C./min. The temperature is held at 750° C. for 1, 2 or 3 days in order to allow fusion and bonding to occur.

Table 5 sets out details of precursor mixture compositions and fibre spinning conditions for examples 21 to 25. The properties of silicalite/polymer composite hollow fibre membranes prepared from 15 wt % polymer solutions containing 20 wt % inorganic binders such as Bentonite, Hyplas clay, Zircon opaque and Standard-borax frit, low expansion frit, lead bisilicate, Lead Sesquisilicate frit, are respectively given. The highest butane adsorption breakthrough time (1 h and 40 minutes) was found with fibres made from lead bisilicate as a binder. The concentration 6,000 ppm butane, flow rate 1 l/min and silicalite weight of the samples and other parameters were kept constant throughout the experiments.

TABLE 5

| Example No Sample name | Solvent/PESF (weight ratio) | Adsorbent/PESF (weight ratio) | Silicalite/Binder (weight ratio) | Average pore size (nm) | Gas permeability (molm$^{-2}$ Pa$^{-1}$ s$^{-1}$) (N2, 1.01325 × 10$^5$ Pa (1 atm)) | Breakthrough Time with butane adsorption (min) |
|---|---|---|---|---|---|---|
| 21 AD 1 025 | DMF/PESF 5.5/1 | (Silicalite + Bentonite)/PESF 5.3/1 | Silicalite/Bentonite 3/1 | 570 | 3.42 × 10$^{-5}$ | 32 |
| 22 AD 2 026 | DMF/PESF 5.5/1 | (silicalite + Hyplas)/PESF 5.3/1 | Silicalite/Hyplas clay 3/1 | 544 | 4.88 × 10$^{-5}$ | 50 |
| 23 AD 3 027 | DMF/PESF 5.5/1 | (Silicalite + Hyplas clay + Zircon opaque)/PESF 6/1 | Silicalite/Hyplas clay/Zircon opaque 3/1/0.5 | 600 | 3.13 × 10$^{-5}$ | 35 |
| 24 AD4 028 | DMF/PESF 5.5/1 | (Silicalite + Standard borax frit)/PESF 6.67/1 | Silicalite/Standard borax fit 3/1 | 1090 | 4.43 × 10$^{-5}$ | 45 |
| 25 Double-layer (25% binder, 75% silicalite) | DMF/PESF 5.5/1 | Lead Bisilicate frit - hollow fibres) | Silicalite/Lead Bisilicate frit 3/1 | 768 | 3.63 × 10$^{-5}$ | 160 |
| 25 Single-layer (25% binder, 75% silicalite) | DMF/PESF 5.5/1 | Lead Bisilicate frit - hollow fibres) | Silicalite/Lead Bisilicate frit 3/1 | 768 | 5.63 × 10$^{-5}$ | 100 |

The fibres produced by this method were inorganic hollow fibres incorporating zeolite materials and exhibited high flux, selectivity and stability. Such fibres could be used to enable selective removal of organic solvent molecules such as butanol, acetone and ethanol from gas or liquid phase; or pervaporation. The process of this example avoids the need for hydrothermal synthesis or sol-gel processes which might otherwise be required to deposit a zeolite layer—this process is therefore much quicker and more scalable.

The hollow fibres of this method (metal, inorganic or polymer matrix) may combine zeolites/silicalites/mesopore high silica molecular sieving materials, catalytic or other functional material, with or without additional layers (thus forming a composite fibre). Such fibres could be used to enable pervaporation, dehydration, molecular sieving/separation of a molecule/mixture of molecules, .e.g., for blood detoxification, for retrieval (concentration) of organic or biological materials such as proteins etc. The addition of silicate materials can provide flexibility and strength, as well as adsorbency.

Figures 18A, 18B, 18C:
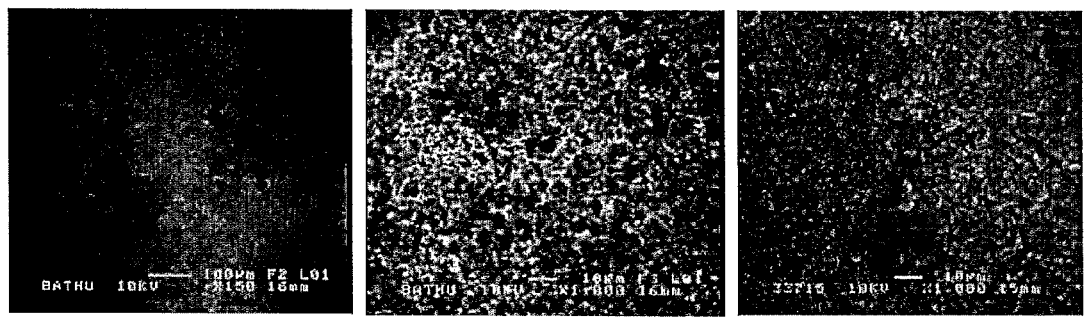

FIG. 18 shows the scanning electron micrographs of silicalite/polymer composite hollow fibre membrane prepared according to example 21 after sintering at 750° C. for 3 days. FIG. 18(a) shows a cross-section; FIG. 18(b) the membrane cross section; and FIG. 18(c) the membrane surface.

The figures reveal a nodular structure with strong bridges between the silicalite clusters. This is because Standard borax frits are ceramic materials whose fused temperature is around 900° C. Standard borax frit and Lead Bisilicate frit found to melted around 700-750° C., ideal temperature required to prepare pure adsorbent fibres. The adsorption capacity of silicalite tends be destroyed when the sintered temperature exceeds 800° C., so that the inorganic binders used must have low melting/hardening temperatures. A great deal of effort has been made to find a suitable binder which does not effect by the solvent or polymer used during the spinning dope preparation.

FIG. 19 shows the scanning electron micrographs of silicalite/polymer composite hollow fibre membrane prepared according to example 24 both pre-sintering and after sintering at 750° C. for 3 days. FIGS. 19(a)-(c) are for the pre-sintered hollow fibre membrane and FIGS. 19(d)-(f) are for the sintered membrane. In each case the images (a)-(c) and (d)-(f) are (1) cross-section, (2) membrane wall, (3) membrane surface respectively.

FIG. 20 shows the SEMs for the single and double layer inorganic silicalite hollow fibres (25% lead bisilicate as a binder and 75% silicalite). FIGS. 20a-c are for the double layer fibres and FIGS. 20d-f are for the single layer fibre.

EXAMPLES 26 TO 28

Adsorbent Hollow Fibres

Table 6 gives data for three further examples of adsorbent fibres (with 4A zeolite for moisture removal/pervaporation) according to the present invention. The fibres produced are flexible polymeric and inorganic adsorbent hollow fibres.

TABLE 6

| Example No. | Fibre OD/ID (mm) | Poiseuille flow method | | Knudsen flow method Average pore diameter (nm) | Gas permeability (molm$^{-2}$ Pa$^{-1}$ s$^{-1}$) (N2, 1.01325 × 10$^5$ Pa (1 atm)) | Water flux (L/hr · m$^2$) Vacuum pump: 10 L/min |
| | | Average skin pore diameter (nm) | Effective surface porosity, $\in/L_p$ (m$^{-1}$) | | | |
|---|---|---|---|---|---|---|
| 26 inorganic double layer 4A/binder (70:30 wt %) | 1.55/0.9 | 520 | 875 | 340 | 4.58 × 10$^{-5}$ | 654.6 |

TABLE 6-continued

| Example No. | Fibre OD/ID (mm) | Poiseuille flow method | | Knudsen flow method Average pore diameter (nm) | Gas permeability (molm$^{-2}$ Pa$^{-1}$ s$^{-1}$) (N2, 1.01325 × 10$^5$ Pa (1 atm)) | Water flux (L/hr · m$^2$) Vacuum pump: 10 L/min |
|---|---|---|---|---|---|---|
| | | Average skin pore diameter (nm) | Effective surface porosity, $\in/L_p$ (m$^{-1}$) | | | |
| 27 inorganic 4A/binder (65:35 wt %) | 1.58/0.8 | 1120 | 1448 | 710 | 5.98 × 10$^{-4}$ | 834.6 |
| 28 (Polymer/4A, 15:85 wt %) | 1.82/1.26 | 486.6 | 573 | 243.3 | 2.82 × 10$^{-5}$ | 166.2 |

FIG. 21 shows SEMs showing cross-sectional structures of 4A zeolite adsorbent and Lead bisilicate frit 70:30 fibres produced according to example 26 after sintering at 750° C. FIG. 22 shows SEMs showing cross-sectional structures of 4A zeolite adsorbent and Lead Bisilicate frit 65:35 fibres made according to example 27 after sintering at 750° C. FIG. 22(*a*) shows a hollow fibre with uniform wall thickness; FIG. 22(*b*) shows a dense adsorbent wall; and FIG. 22(*c*) shows 4A zeolite crystals embedded within the matrix.

FIG. 23 shows an SEM showing cross-sectional structures of double layer 4A zeolite adsorbent and polymer 15:85 prepared according to example 28.

Triple Orifice and Quadruple Orifice Spinneret

Figure 24:
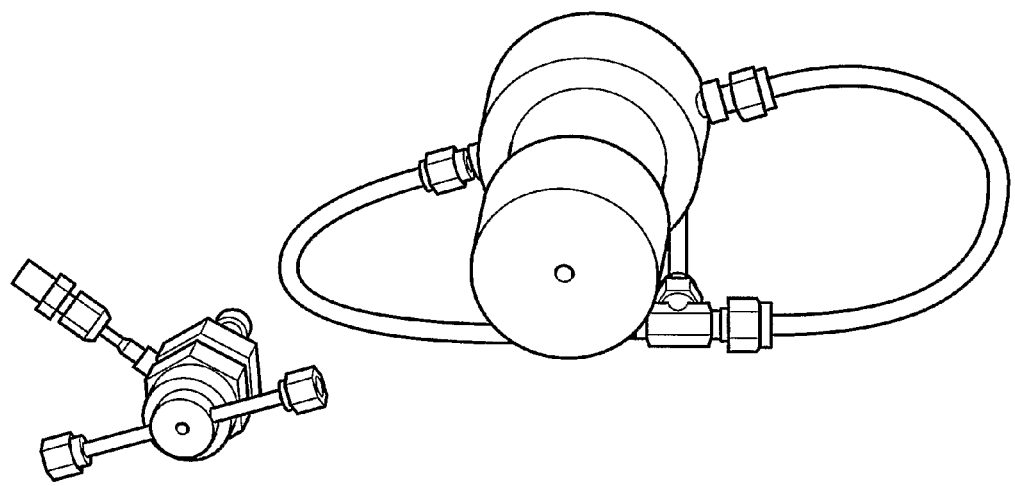
FIGS. 24 to 26 are photographs of embodiments of double, triple and quadruple orifice spinnerets according to an aspect of the present invention.
Figure 25:
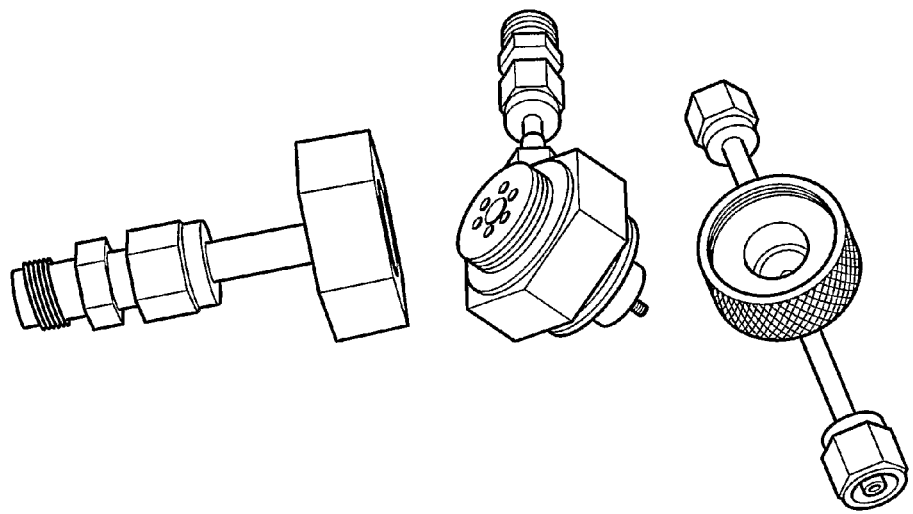
Figure 26:
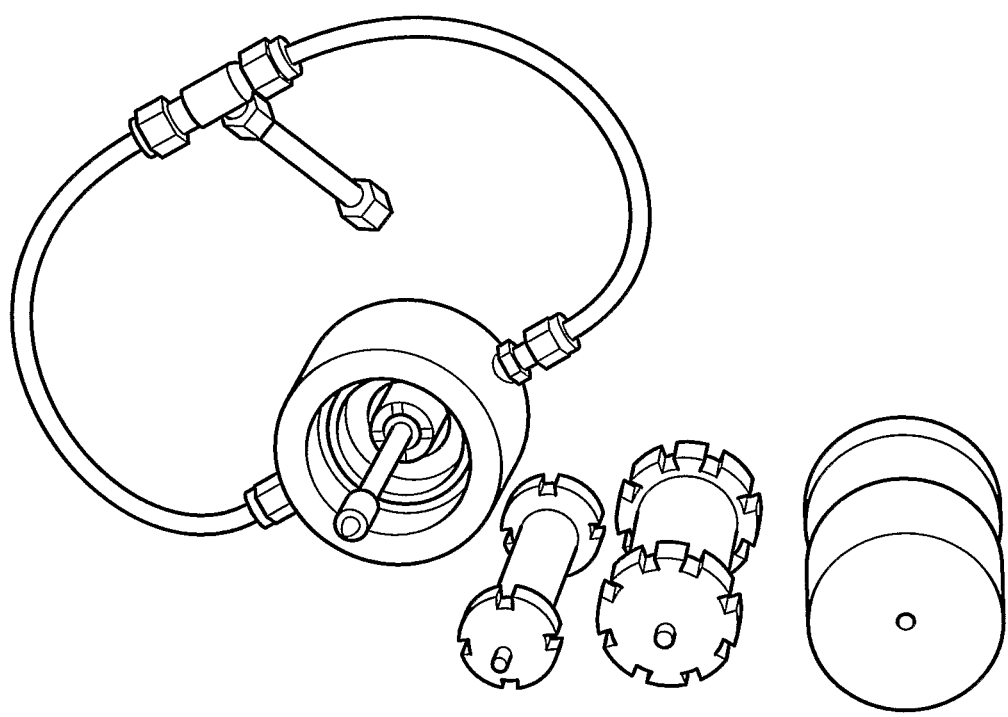

FIG. 24 is a photograph of embodiments of a triple orifice spinneret (left) and a quadruple orifice spinneret. These will be described in further detail below. FIG. 25 is a photograph of the components of one embodiment of a triple orifice spinneret and FIG. 26 is a photograph of one embodiment of a quadruple orifice spinneret.

Triple Orifice Spinneret

Figure 27:
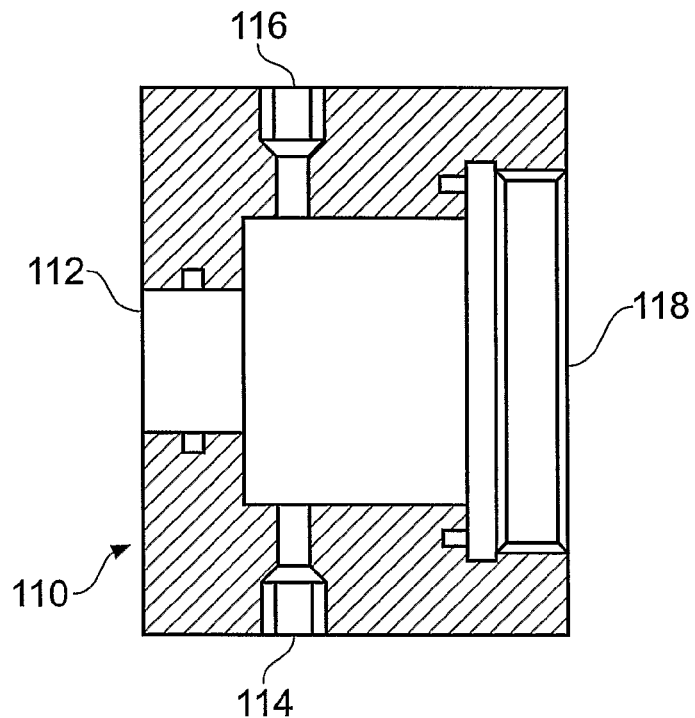

FIGS. 27 to 30 show the components for one embodiment of a triple orifice (double layer) spinneret. FIG. 27 shows a base module 110 to which the precursor feeds are fed and to which the delivery chambers are attached. The precursor feeds may be the same or different and may therefore be fed from the same reservoir (not shown). Alternatively, they may be of different composition and accordingly supplied from different reservoirs under controlled pressure conditions. Feed 112 is for the bore liquid which passes through the centre of the fibre to form the hollow core. Precursor feeds 114, 116 are for the two layers of the fibre. At the outlet 118 of the base module 110 is a screw thread (not shown) to which the delivery chambers are secured.

Figure 28:
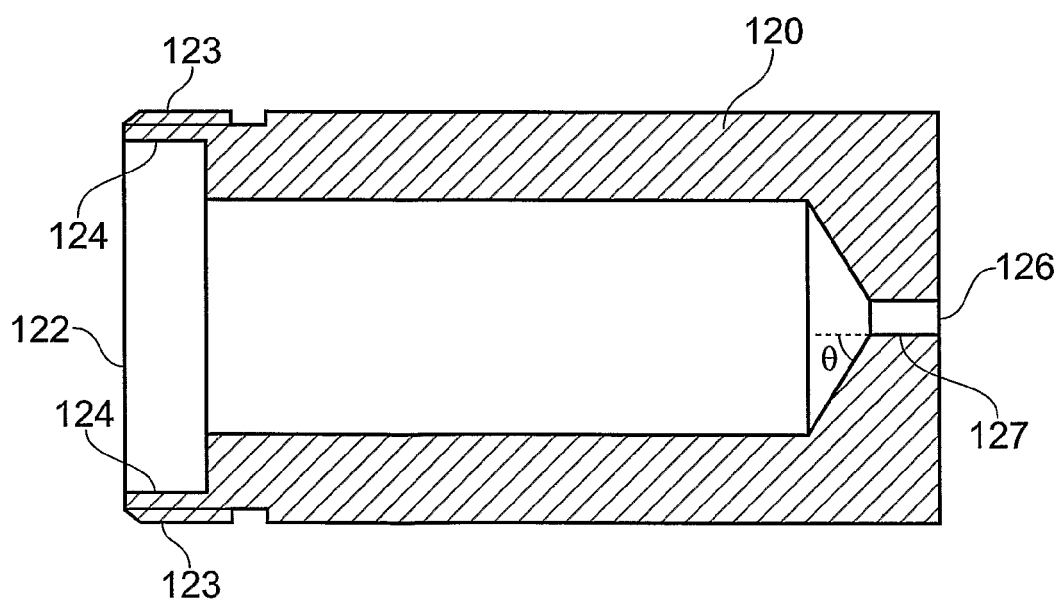

FIG. 28 shows the outer delivery chamber 120 which controls the precursor feed for the outer layer of the fibre. At the inlet end 122 of the chamber there is provided an external thread 123 to secure the chamber to the base module 110, and an internal thread 124 to which the second chamber 130 is secured. At the outlet, there is a circular orifice 126 at the end of a neck region 127. This orifice 126 will, when the spinneret is assembled, have further outlets passing though it leaving an annular passage through which the material for the outer layer will pass. The outer diameter of this orifice may, for example, be 4 mm. The angle θ of the slope directing the material to the orifice is preferably 60° but may be from 45-65°. Ideally the angles throughout the spinneret should remain constant for all chambers to maintain uniform delivery of the precursor material.

FIGS. 29 and 29*a* show the second delivery chamber 130 which together with the outer delivery chamber controls the precursor feed for the outer layer of the fibre. At the inlet end 132 of the chamber there is provided a securing ring 134 which has an external thread dimensioned to cooperate with the internal thread 224 of the first chamber 120. The ring 134 has channels 135 cut in the ring at regularly spaced intervals. In a preferred embodiment there are eight channels spaced evenly around the circumference of the ring. These channels permit the flow of the precursor feed for the outer layer to pass from the reservoir, through the spinneret to the outlet 136 of the second delivery chamber.

The outlet takes the form of a circular orifice 136 and the orifice extends in a neck 137 dimensioned to fit inside the neck 127 of the first delivery chamber thereby forming the channel for the intermediate material. This orifice will, when the spinneret is assembled, have further outlets passing though it thereby leaving an annular passage through which the material for the inner layer will pass. The outer diameter of this orifice 137 may, for example, be 3.9 mm and the internal diameter may be 3.5 mm. The angle θ of the external slope of delivery chamber 130 must be the same as θ in the first delivery chamber to maintain the width of the passage through which the outer layer flows. This will also minimise pressure losses in the spinneret. The angle φ of the internal slope which will direct the inner layer of material to the outlet is preferably the same as θ, namely preferably 60°, but may be from 45-65°. As mentioned above, the angles preferably remain constant throughout the spinneret to ensure uniform flow.

FIGS. 30, 30*a* and 30*b* show the third delivery chamber 140 which controls the precursor feed for the inner layer of the fibre. At the inlet end 142 of the chamber there is provided a ring 144 which rests against the ring 134 of the second delivery chamber 130. The ring 144 has channels 145 cut in the ring at regularly spaced intervals. In a preferred embodiment there are four channels spaced evenly around the circumference of the ring. These channels permit the flow of the precursor feed for the inner layer to pass from the source, through the spinneret to the outlet 146 of the third delivery chamber. Corresponding channels 145*a* are also found on the cap at the front end of the chamber which includes the outlet 146.

Again, the outlet takes the form of a circular orifice 146 and the orifice extends in a neck 147 dimensioned to fit inside the neck 137 of the second delivery chamber thereby forming the channel for the intermediate material. The outer diameter of this orifice 147 may, for example, be 2.5 mm and the internal diameter (i.e. the diameter of the hollow core of the produced fibre) may be 2.1 mm. The angle φ of the external slope of delivery chamber 140 must be the same as φ in the second delivery chamber to maintain the width of the passage through which the inner layer flows. This will also minimise pressure losses in the spinneret. The angle α of the internal slope which will direct the bore fluid to the outlet of the spinneret is preferably the same as θ and φ, namely preferably 60°, but may be from 45-65°. Constant angles throughout the spinneret enable uniform delivery of precursor.

The precursor for the inner layer of the fibre passes on the outside of the third delivery chamber, bounded on the other side by the second delivery chamber. The bore liquid passes through the centre of the third delivery chamber to the needle outlet 146.

Quadruple Orifice Spinneret

Figure 31:
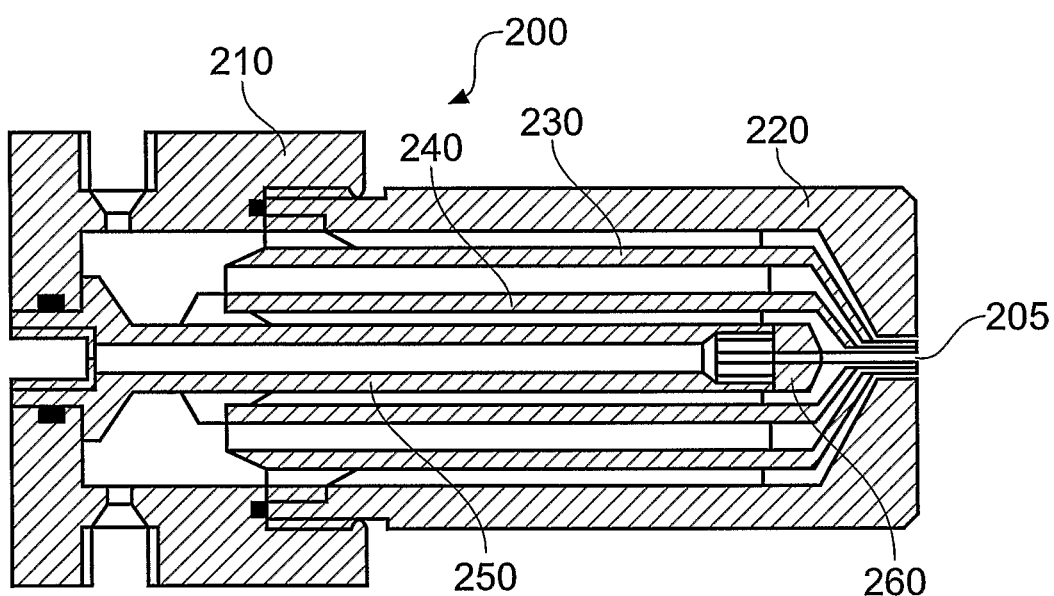
FIGS. 31-37 show a quadruple orifice spinneret for use in the production of a triple layer fibre.

FIGS. 31 to 37 show the components for one embodiment of a quadruple orifice, triple layer fibre spinneret. FIG. 31 shows the spinneret 200 assembled. It comprises six members each of which is shown in greater detail in the following figures. Typical dimensions of the spinneret are 140 mm length by 70 mm diameter.

Figure 32:
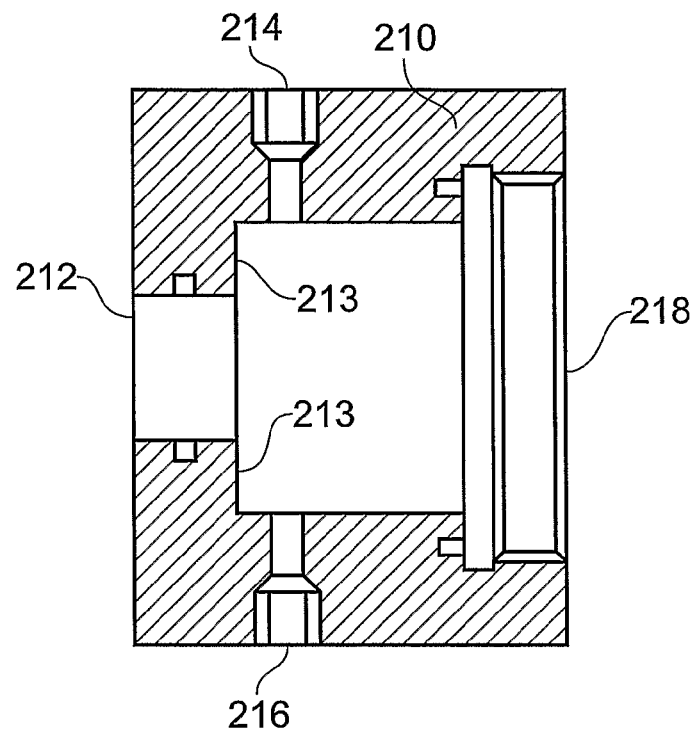

FIG. 32 shows the base module 210 to which the precursor feeds are fed and to which the delivery chambers are attached. The precursor is fed through three feed inlets spaced around the perimeter of the module 210. Two of these inlets are shown as 214, 216. The third (not shown) may be arranged such that it extends out in an orthogonal direction from feeds 214, 216. The feeds may all be the same composition thereby producing a fibre of one composition, but greater strength and with fewer defects, and in this case the inlets are fed from the same reservoir (not shown). Alternatively, the feeds may be of two or three different compositions and accordingly supplied from different reservoirs (not shown) under controlled pressure conditions. Feed 212 is for the bore liquid feed which passes through the precursor material and forms the hollow core in the finished product. At the outlet 218 of the base module 218 is a screw thread (not shown) to which the delivery chambers are secured.

Figure 33:
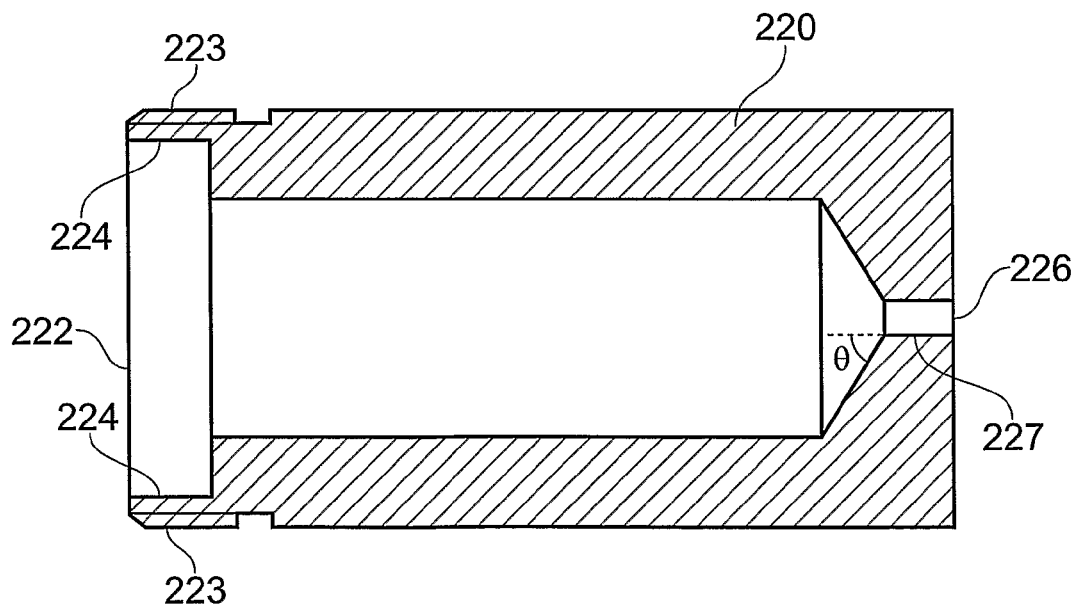

FIG. 33 shows the outer delivery chamber 220 which controls the precursor feed for the outer layer of the fibre. At the inlet end 222 of the chamber there is provided an external thread 223 to secure the chamber to the base module 210, and an internal ridge 224 to support the second chamber 230. At the outlet, there is a circular orifice 226 at the end of a neck region 227. This orifice 226 will, when the spinneret is assembled, have further outlets passing though it leaving an annular passage through which the material for the outer layer will pass. The outer diameter of this orifice may, for example, be 4 mm. The angle θ of the slope directing the material to the orifice is preferably 60° but may be from 45-65°. Ideally the angles throughout the spinneret should remain constant for all chambers to maintain uniform delivery of the precursor material.

Figure 34:
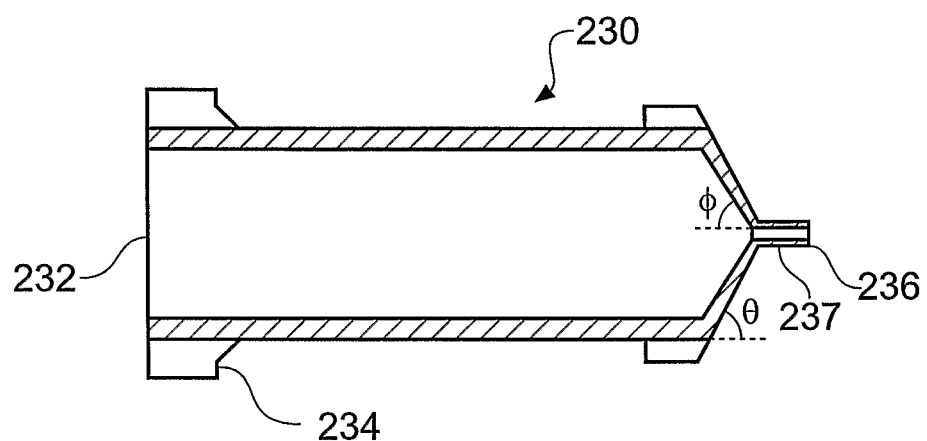
Figure 34A:
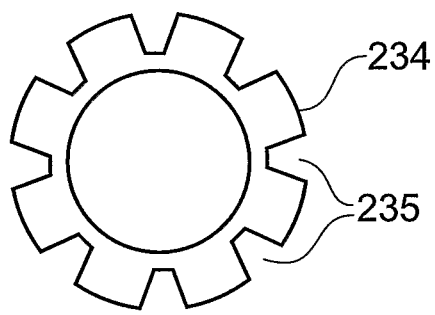

FIGS. 34 and 34a show the second delivery chamber 230 which controls the precursor feed for the intermediate layer of the fibre. At the inlet end 232 of the chamber there is provided a securing ring 234 which has an external thread dimensioned to cooperate with the internal thread 224 of the first chamber 220. The ring 234 has channels 235 cut in the ring at regularly spaced intervals. In a preferred embodiment there are 8 channels spaced around the circumference of the ring. These channels permit the flow of the precursor feed for the intermediate layer to pass from the source, through the spinneret to the outlet 236 of the second delivery chamber.

Again, the outlet takes the form of a circular orifice 236 and the orifice extends in a neck 237 dimensioned to fit inside the neck 227 of the first delivery chamber thereby forming the channel for the intermediate material. Again, this orifice will, when the spinneret is assembled, have further outlets passing though it thereby leaving an annular passage through which the material for the inner layer will pass. The outer diameter of this orifice 237 may, for example, be 3.9 mm and the internal diameter may be 3.5 mm. The angle θ of the external slope of delivery chamber 230 must be the same as θ in the first delivery chamber to maintain the width of the passage through which the intermediate layer flows. This will also minimise pressure losses in the spinneret. The angle φ) of the internal slope which will direct the inner layer of material to the outlet 205 is preferably the same as θ, namely preferably 60°, but may be from 45-65°. As mentioned above, the angles preferably remain constant throughout the spinneret to ensure uniform flow.

Figures 35, 35A, 35B:
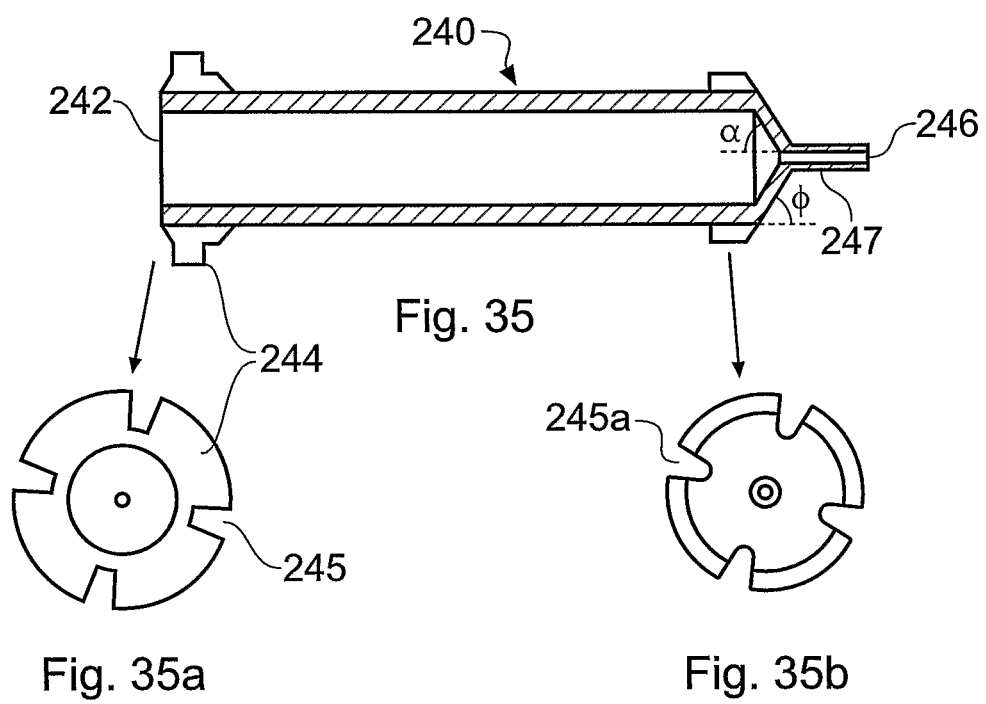

FIGS. 35, 35a and 35b show the third delivery chamber 240 which controls the precursor feed for the inner layer of the fibre. At the inlet end 242 of the chamber there is provided a ring 244 which rests against the ring 234 of the second delivery chamber 230. The ring 244 has channels 245 cut in the ring at regularly spaced intervals. In a preferred embodiment there are four channels spaced around the circumference of the ring. These channels permit the flow of the precursor feed for the intermediate layer to pass from the source, through the spinneret to the outlet 246 of the third delivery chamber. Corresponding channels 245a are also found on the cap at the front end of the chamber which includes the outlet 246.

Again, the outlet takes the form of a circular orifice 246 and the orifice extends in a neck 247 dimensioned to fit inside the neck 237 of the second delivery chamber thereby forming the channel for the intermediate material. Again, this orifice will, when the spinneret is assembled, have further outlets passing though it thereby leaving an annular passage through which the material which will form hollow core of the fibre will pass. The outer diameter of this orifice 247 may, for example, be 2.5 mm and the internal diameter may be 2.1 mm. The angle φ of the external slope of delivery chamber 240 must be the same as φ in the second delivery chamber to maintain the width of the passage through which the inner layer flows. This will also minimise pressure losses in the spinneret. The angle α of the internal slope which will direct the bore fluid to the outlet 205 is preferably the same as θ and φ), namely preferably 60°, but may be from 45-65°. Constant angles throughout the spinneret enable uniform delivery of precursor.

Figure 36:
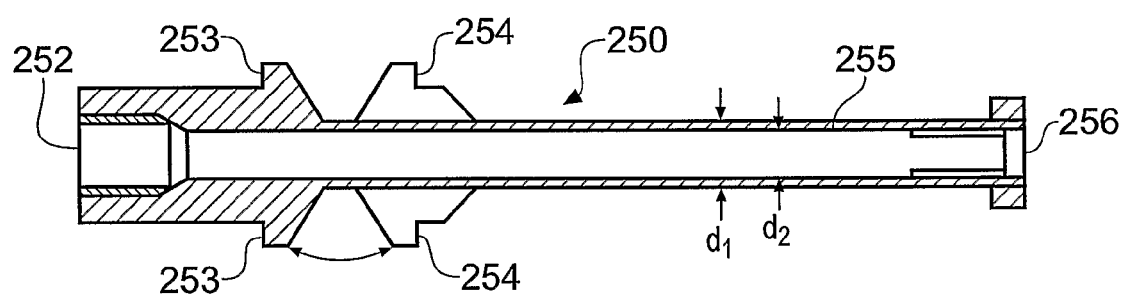
Figure 37:
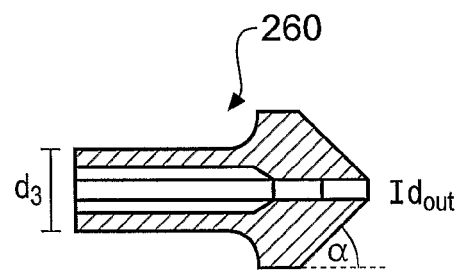

FIG. 36 shows a further chamber 250 through which the bore fluid flows. Attached to this chamber at the front end is a bore needle 260 as shown in enlarged form in FIG. 37. The bore needle 260 will define the dimension of the inner hollow core of the fibre and may therefore be varied from embodiment to embodiment as appropriate. The inlet 252 of the chamber 250 is arranged to cooperate with the bore liquid inlet feed 212 of base module 210. The shoulders 253 abut the inner surface 213 of the base module 210. The shoulders 254 abut the ling 244 at the inlet end of third chamber 240. The shoulder portion 254 has matching channels which line up with the channels 245 in ring 244. There is also a small gap below the shoulder 254 to allow further passage of the precursor fluid. The core 255 of the chamber 250 has an external diameter $d_1$ and an internal diameter $d_2$. Preferred values for $d_1$ and $d_2$ may be 8 mm and 4 mm respectively but any values in the range 1-20 mm may be appropriate for a specific embodiment.

At the front end of chamber 250 there is an outlet 256. Towards this end the core may increase in internal diameter to accommodate the bore needle 260 (see FIG. 37). For example the internal diameter may increase from 4 mm to 5.2 mm. The bore needle 260 is arranged to fit inside the outlet 256 of chamber 250 as a snug push fitting. The dimension $d_3$ of the bore needle may, for example, be 5 mm to fit inside the outlet end 256 of the chamber 250 having an internal diameter of 5.2 mm. The diameter of the needle $d_{out}$ may be in the range 0.1-5 mm, more preferably 0.5-3 mm, for example 1 mm. This defines the size of the hollow core of the fibre. The angle α should be the same as in the third delivery chamber 240 to maintain the width of the passage through which the precursor fluid flows. As indicated above, α is preferably 60°, but may be in the range from 45-65°.

Figure 38:
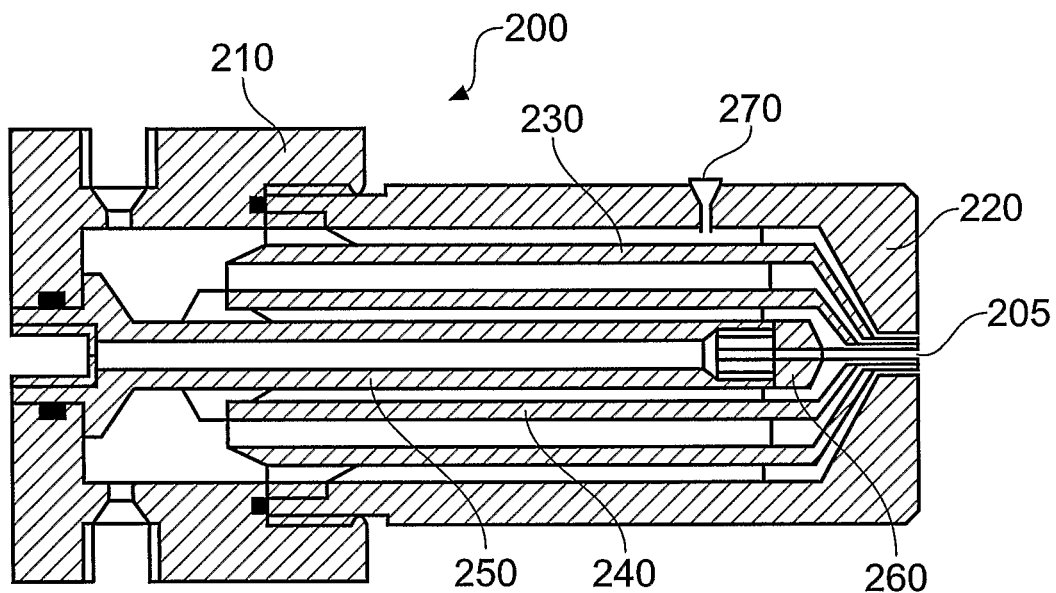
FIG. 38 shows a quadruple orifice spinneret including an additional access point for the introduction of a thin layer of adsorbent as an outer coating.

FIG. 38 shows a similar view to FIG. 31, but the spinneret has an additional access point 270 for the introduction of a thin layer of adsorbent or other functional material. This will form an outer coating in addition to the three layers of the fibre. This thin layer may be present to help the selectivity of the fibre for a particular adsorbate.

Figure 39:
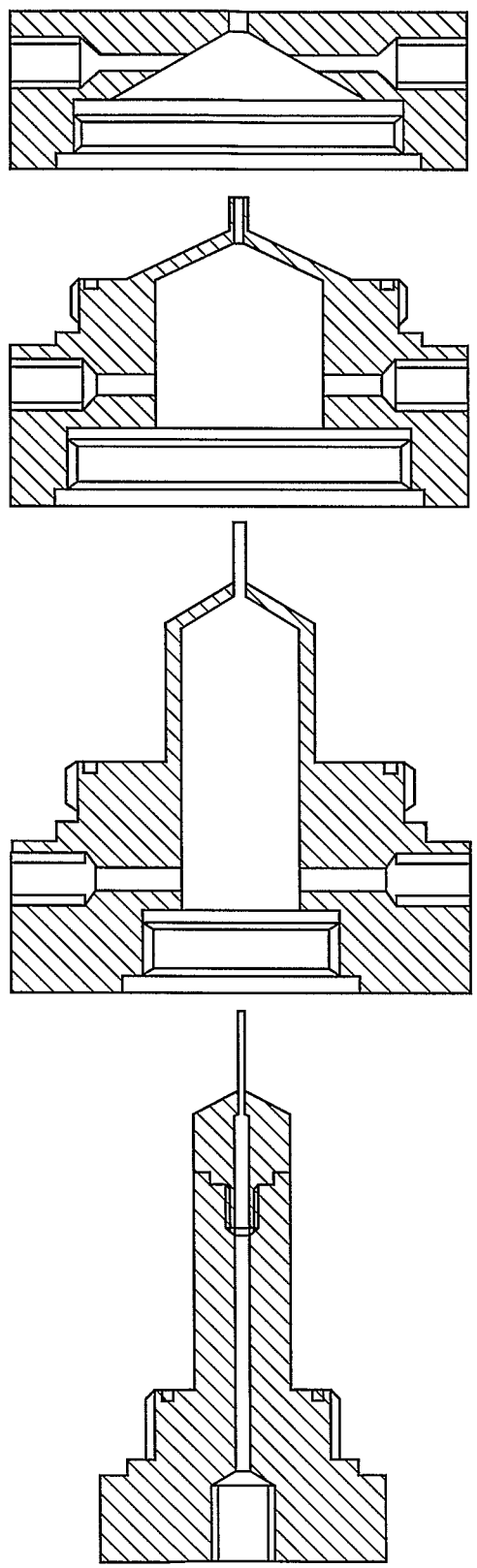
FIG. 39 shows an alternative design for the quadruple orifice spinneret in which each of the chambers has independent feeds.

FIG. 39 shows an alternative design for the quadruple orifice spinneret in which each of the chambers has independent feeds. The arrangement of the chambers is similar to that described with respect to FIGS. 31 to 37 above but each chamber has clear and separate precursor feeds which do not all pass through the base module.

FIG. 40 shows schematically three different designs for producing triple layer fibres using the quadruple orifice spinneret. FIG. 40a shows a spinneret 280 for the delivery of gel precursor of one composition from a single piston pressure vessel 282. The fibre produced is stronger and defect free. The bore liquid passes from reservoir 281 through the centre of the spinneret 280 to form the hollow core of the fibre. Each of the channels leads to the outlet 290 which may take the form shown in FIG. 40d. FIG. 40b shows a spinneret 280 for the delivery of three different compositions from three different delivery vessels 283, 284, 285, the pressure of which is controlled independently. Each composition may have different types of adsorbent with different functional properties attached to them. Using this system it is possible to produced compact fibres with very small particles to achieve small pores of the order of 1-2 nm. FIG. 40c shows a design for the delivery of two different compositions. The two inner layers are of the same composition fed from delivery vessel 286 and the outer layer is of a different composition from delivery vessel 287. This fibre has the advantage of a stronger fibre with fewer defects of a first composition, with an outer layer which is specifically chosen to have the functional properties required, for example in the choice of adsorbent.

FIG. 40d shows a typical arrangement of the outlet 290 of the spinneret 280. The three concentric rings of precursor each have a thickness of 0.5 mm. For example, the inner core formed by the bore liquid may have a diameter a of 1.1 mm. The outer diameter of the first layer of precursor then has a diameter b of 2.1 mm. The intermediate layer has an inner diameter c of 2.5 mm and an outer diameter d of 3.5 mm. The outer layer has an inner diameter of 3.9 mm and an outer diameter of 4.9 mm.

Figure 41:
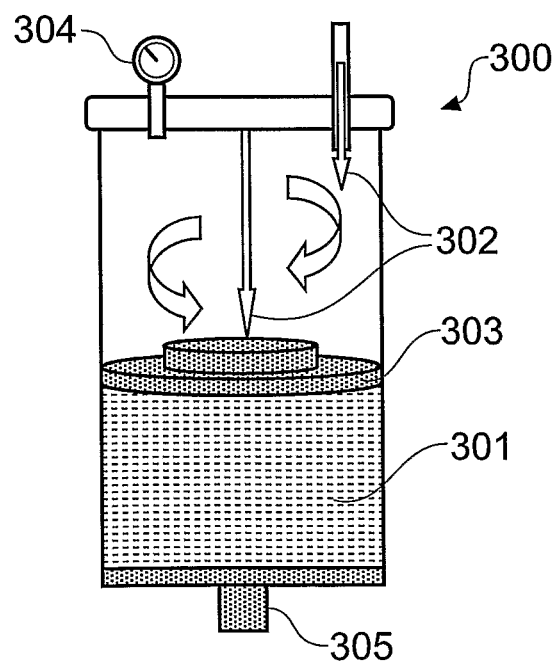
FIG. 41 shows a pressure vessel suitable as a delivery vessel for any spinneret of the present invention.

FIG. 41 shows a pressure vessel 300 suitable as a delivery vessel to the spinneret. The precursor gel 301 is maintained under pressure by means of jets of nitrogen 302 being applied to a plate type piston 303. The pressure is measured by means of a pressure gauge 304. The precursor is fed out of the vessel 300 through the outlet means 305 to the appropriate feed of the spinneret. As shown in FIG. 41, the outlet is conically shaped and may be, for example, 5-15 mm in diameter, preferably 10 mm. The vessel 300 is made of stainless steel and may have dimensions of 150-200 mm height by 60-80 mm diameter. The delivery vessel can also be heated by a heating tape.

EXAMPLES 29 TO 31

Comparison of Solvents

The adsorbent material used for the membrane was 200-mesh silicalite powder (MHSZ 423) purchased from UOP. Polyethersulfone (PESF) was used as the polymer. N,N-dimethylacetamide (DMAc) (99.9%, HPLC Grade, Merck), 1-methyl-2-pyrrolidone (NMP) (99+%, Spectrophotometric Grade, Merck), and N,N-Dimethylformamide (DMF) (99.8%, A.C.S., Reagent, Aldrich), were used to prepare the polymer solution. Polyvinylpyrrolidone (PVP) (Sigma, Mw=10,000) and Acetone (Aldrich) were used as additives. Distilled water was used as an internal coagulant. Tap water was used as the external coagulant.

The required quantity of organic solvent (NMP, DMAc or DMF) was poured into a one-liter wide-neck bottle and then the desired quantity of polymer (PESF) was slowly added. The mixture was stirred on a rotary pump to form the polymer solution. After the clear polymer solution was formed, a desired amount of inorganic adsorbent (silicalite) powder was then added and the mixture was stirred for two days to ensure a good dispersion. This is important in the spinning process, as aggregates can lead to unstable spinning and blocking of the spinning dye. An IKA® WERKE stirrer was used at a speed of between 500-1000 rpm. PVP or acetone as an additive was introduced into the solution to modulate the viscosity of the mixture when required. In forming the adsorbent hollow fibre, it was passed through a water bath to aid the phase inversion process. The hollow fibre was then washed thoroughly in a second water bath. Care was taken to ensure continuity of the pressure and internal water support in order to avoid entrapment of air and separation of the fibre, which would eventually result in an unsuccessful spinning. The hollow fibres were left to soak for 3-4 days in fresh water; this being important for thorough removal of residual solvent. The fibres were then dried at ambient conditions for seven days before regeneration (firing) and characterization.

Characterisation

Scanning Electron Microscope (SEM)

A scanning electron microscope (SEM) was used for the characterization of all the hollow fibre membranes. The surface structure, particle size and silicalite distribution in the matrixes were observed using the JEOL JSM6310 model. All samples were dried at 105° C. for 24 hours before use. Firstly, the sample was frozen in liquid nitrogen for 20-30 seconds and then sectioned using a sharp blade. Then, a specimen plate was coated with a thin layer of gold under 3 mbar pressure for 3-5 minutes with the Edwards Sputter Coater (S150B). The SEM was operated in the range 10-20 kV and micrographs were taken of a number of areas on each sample.

Viscosity Test

The viscosity values of the spinning dopes were obtained by using a Bohlin CS 50 Rheometer (Stress Viscometry Model). In order to spin fibres, the viscosity of the polymer dope should be generally between 7-18 Pa·s. It is important when applying polymer dope, that the correct amount is used. Over filling or under filling will result in errors in viscosity.

Gas Permeation Test

Dead-end gas permeation experiments were carried out to determine the characteristics and performance of the fibres. Fibres were sealed with Araldite® at one end and nitrogen pressure was applied on the outside of the fibre at the other end. Nitrogen flow was measured at different transmembrane pressures by a Brooks mass flow indicator. Nitrogen was supplied by BOC gases. For purpose of determining porosity and pore size distribution of adsorbent filled polymeric fibres poiseuille flow equations were used. The average pore size (r) and the effective surface porosity (defined as the ratio of the surface porosity and the effective pore length, $\epsilon/L_p$), are two important parameters of a membrane. The intercept ($K_0$) and slope ($P_0$) were determined by plotting the pressure-normalized permeation flux against average pressure. The average pore size (r) and the effective surface porosity, $\epsilon/L_p$, were calculated from the following equations:

$$r=(16/3)(P_0/K_0)(8RT/\pi M)^{1/2}\mu \quad (1)$$

$$\epsilon/L_p=8\mu RTP_0/r^2 \quad (2)$$

where R is the gas constant, T the absolute temperature, M the molecular weight and $\mu$ the gas viscosity.

The average pore size and effective surface porosity, $\epsilon/q2$ of inorganic fibres were determined by Knudsen flow equations. Where $\epsilon$ is the surface porosity and q is the tortuosity factor.

Adsorption by n-Butane Breakthrough Curve

Adsorption capacity of the adsorbent fibres were determined by dynamic adsorption experiments using apparatus shown in FIG. 42, details of which are given below.

Figure 42:
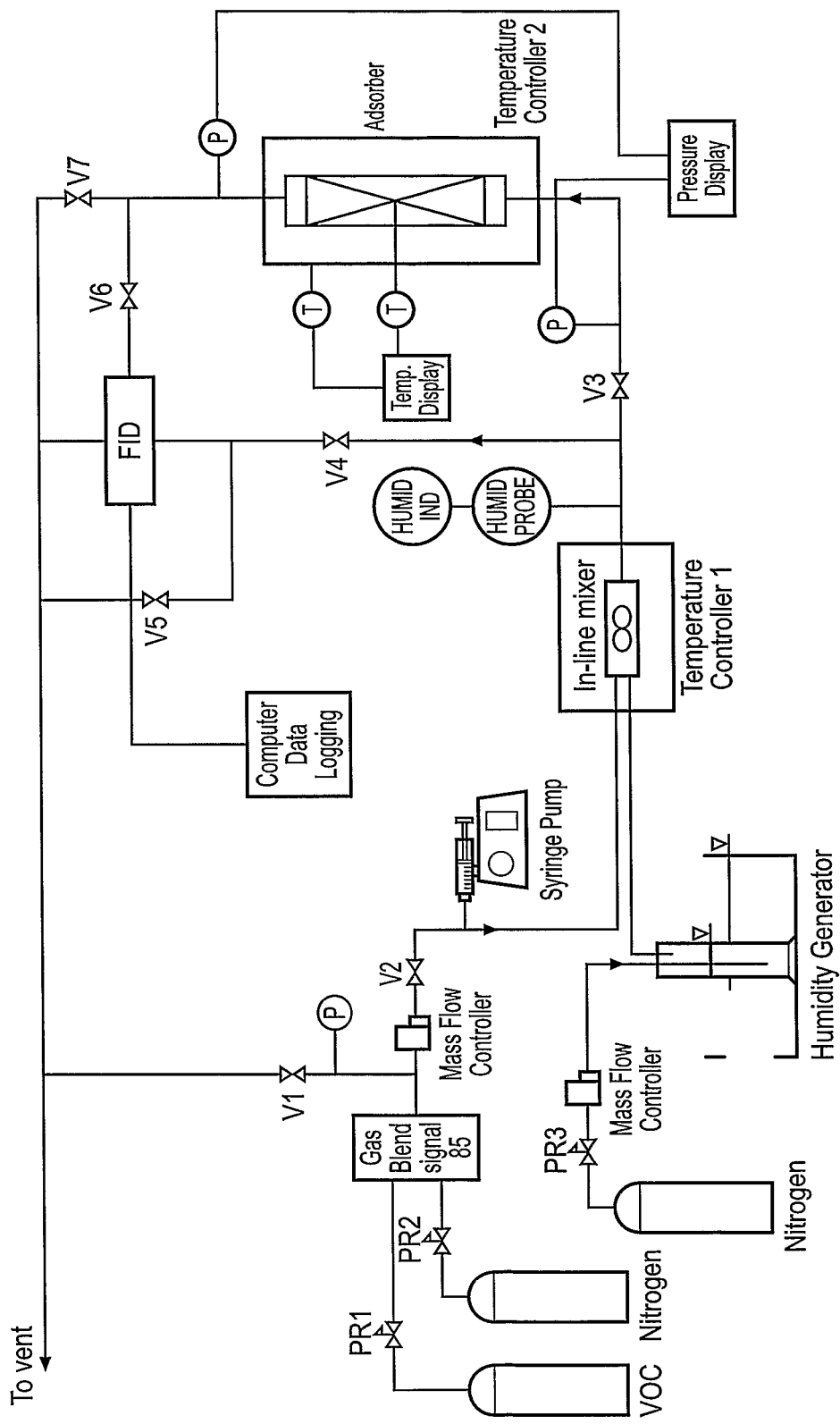
FIG. 42 shows schematically the apparatus used to measure the breakthrough for Butane Adsorption.

Referring to FIG. 42, the breakthrough apparatus for butane adsorption is shown. The adsorption bed was purged with nitrogen to remove any remaining traces of impurities including moisture which might have been prematurely adsorbed when the column was installed, and adsorption experiments were carried out between 20 and 25° C. If the bed had been previously reactivated in the separate regeneration unit, it was transferred into the test-system with great care to avoid exposing the adsorbent to air, which could result in contamination.

Gas flow through the adsorption column was vertically upwards during all adsorption experiments. Once the bed had reached the desired temperature, it was then isolated from the rest of the system by means of the 3-way valve at the bottom (V6 in FIG. 42) and a 2-way plug valve at top of the column (V8). This left the adsorbent in a stagnant pure nitrogen environment while the nitrogen flow bypassed the bed and flowed to the vent. After ensuring that the feed composition and flowrate were steady and as required, the adsorption run was commenced by switching the 3-way valve (V6) to permit feed flow. At this instant the feed check-bypass valve (V11) was closed and the 2-way valve (V8) at the top of column was opened to direct effluent to a Flame Ionisation Detector (FID), and data logging was initiated.

Throughout the experiment, the feed flowrate and temperature together with the column pressure were monitored manually, while the effluent concentration and temperature of the column were acquired by the computer every ten seconds. The run was terminated when the effluent concentration detected by the FID was approximately the same as the feed concentration or when the changes between sample measurements became almost imperceptible. The experimental runs can last between a few hours to several days. Following each run, the feed concentration and flowrate, and all temperatures were again checked and recorded. An important property of the adsorbent fibre is the equilibrium loading and it was evaluated directly from the breakthrough curves to compare loading of volatile on adsorbent fibres.

The adsorption column contained a fixed amount of adsorbent material (14 g), whether hollow fibre pellets (broken into 5.0×1.4 mm pieces) of silicalite hollow fibre module or the commercial pellets of silicalite (1.0×1.18 mm mesh, purchased from UOP). The physical properties of the fibres used are shown in Table 8. N-butane was selected as a model VOC to compare the dynamic adsorption performance of the commercial silicalite and hollow fibres prepared from three different solvents, DMF, DMAc, NMP. Example 29 (DMF/PESF), Example 30 (NMP/PESF) and Example 31 (DMAc/PESF) contained similar silicalite: polymer ratios of 75:25 w %. Commercial pellets used also have a silicalite:binder ratio of 75:25 w %. The total gas flow rate was fixed at 1.5 l·min$^{-1}$ and the concentration of n-butane was also fixed at 6000 ppm in nitrogen.

The feed concentration and the progress of the breakthrough curve from the adsorption column were continuously monitored with a flame ionisation detector (Signal Instruments, model 3000). Prior to all adsorption experiments, the adsorbent materials were regenerated for 24 hours under a nitrogen flow (1 l. min$^{-1}$) at 200° C. All adsorption experiments were carried out at 25° C. The gas flow through the column was upwards for adsorption and downwards during the regeneration part of the cycle. The experiments were terminated when the n-butane concentration in the effluent from the column became equal to the feed concentration.

Results

Adsorbent Hollow Fibre (SEM and Gas Permeation)

Figure 43A:
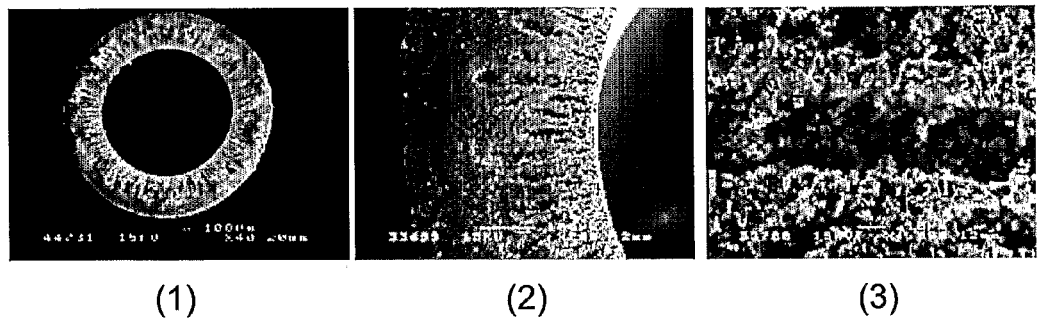
FIG. 43 shows scanning electron micrographs showing cross-sections of silicalite/polymer composite hollow fibres prepared from 25 wt % polymer solution using three different solvents in examples 29-31 showing respectively (1) cross-section, (2) membrane wall, (3) membrane surface, FIG. 43a Example 29 (DMF)
FIG. 43b Example 30 (NMP)
FIG. 43c Example 31 (DMAc)

FIGS. 43(a), (b) and (c) show the SEM micrographs of silicalite/polymer composite hollow fibre membranes prepared from 25 wt % polymer using three different solvents. The adsorbent fibres are perfectly formed and symmetrical and the thickness of the wall is approximately 300 µm. The micrographs show that the inorganic adsorbent particles are present in the cavities of the polymer matrix and not entrapped in the polymer itself. Most importantly it shows that the silicalite particles are not covered by a polymer coating. It seems that the particles act as nuclei around which the polymer lean phase can grow. Table 7 presents the results of pore size, effective surface porosity and nitrogen permeability for the adsorbent hollow fibres developed.

TABLE 7

| Example No. | Solvent/PESF (weight ratio) | Silicalite/PESF (weight ratio) | Average pore diameter (nm) | Gas permeability (mol m$^{-2}$ Pa$^{-1}$ s$^{-1}$) (N2, 1.01325 × 10$^5$ Pa (1 atm)) | Effective surface porosity (m$^{-1}$), $\epsilon/L_p$ |
|---|---|---|---|---|---|
| Ex 29 (DMF/PESF) | DMF/PESF 4 | Silicalite/PESF 3 | 609 | 2.66 × 10$^{-5}$ | 400 |
| Ex 30 (NMP/PESF) | NMP/PESF 4 | Silicalite/PESF 3 | 740 | 3.06 × 10$^{-5}$ | 349 |
| Ex 31 (DMAc/PESF) | DMAc/PESF 4 | Silicalite/PESF 3 | 235 | 1.03 × 10$^{-5}$ | 530 |

It was found that in order to spin good fibres with high inorganic powder content, the viscosity of the polymer dope should be between 8-18 Pa·s. The viscosity of dope prepared from NMP (10.7 Pa·s) found to be higher than the dopes prepared from DMF (9.2 Pa·s) and DMAc (8.6 Pa·s). As the viscosity of the spinning solution increased the wall thickness of the fibre have increased. The SEMs show that the wall thickness have increased as follows: Example 31 (0.3 mm)<Example 29 (0.35 mm)<Example 30 (0.47 mm).

Figure 43B:
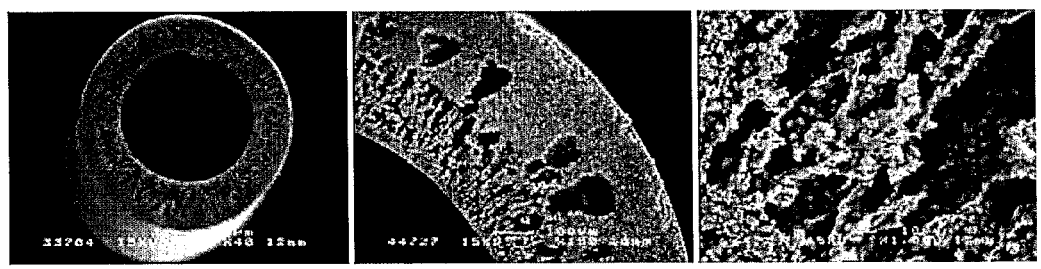
Figure 43C:
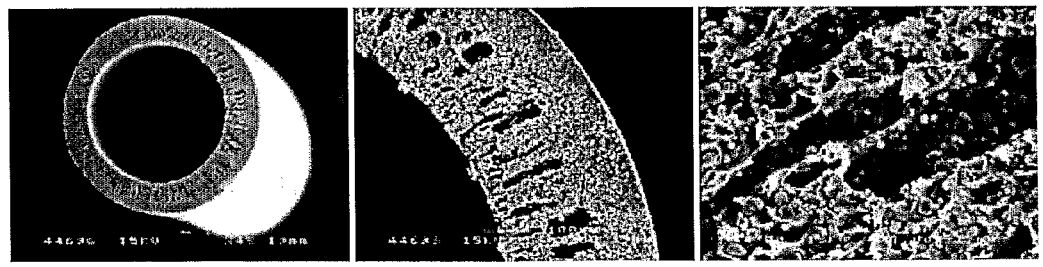

The N₂ permeation of the membrane prepared from NMP is higher than that of the fibres prepared from DMF and DMAc as a solvent. High molecular weight NMP may have influenced the polymer solution to form large pores and easily leach out from the fibre membrane during the phase inversion process. As FIGS. 43(a), (b) and (c) show, the cross-sectional structures of the silicalite/polymer composite hollow fibres are similar for each membrane. However, near the inner wall of the hollow fibre of FIG. 43(b), large cavities are formed. The micrographs reveal that near the inner wall of the fibre, long finger-like structures are present. The appearance of the fibre structures shown in FIG. 43 can be attributed to the rapid precipitation which occurred at the inner fibre wall, resulting in the long finger-like structures. The average pore diameter of NMP/PESF is larger than DMF/PESF and DMAc/PESF; the result is confirmed, as shown in Table 7, by the nitrogen permeation test using the Poiseuille flow model.

Figure 44:
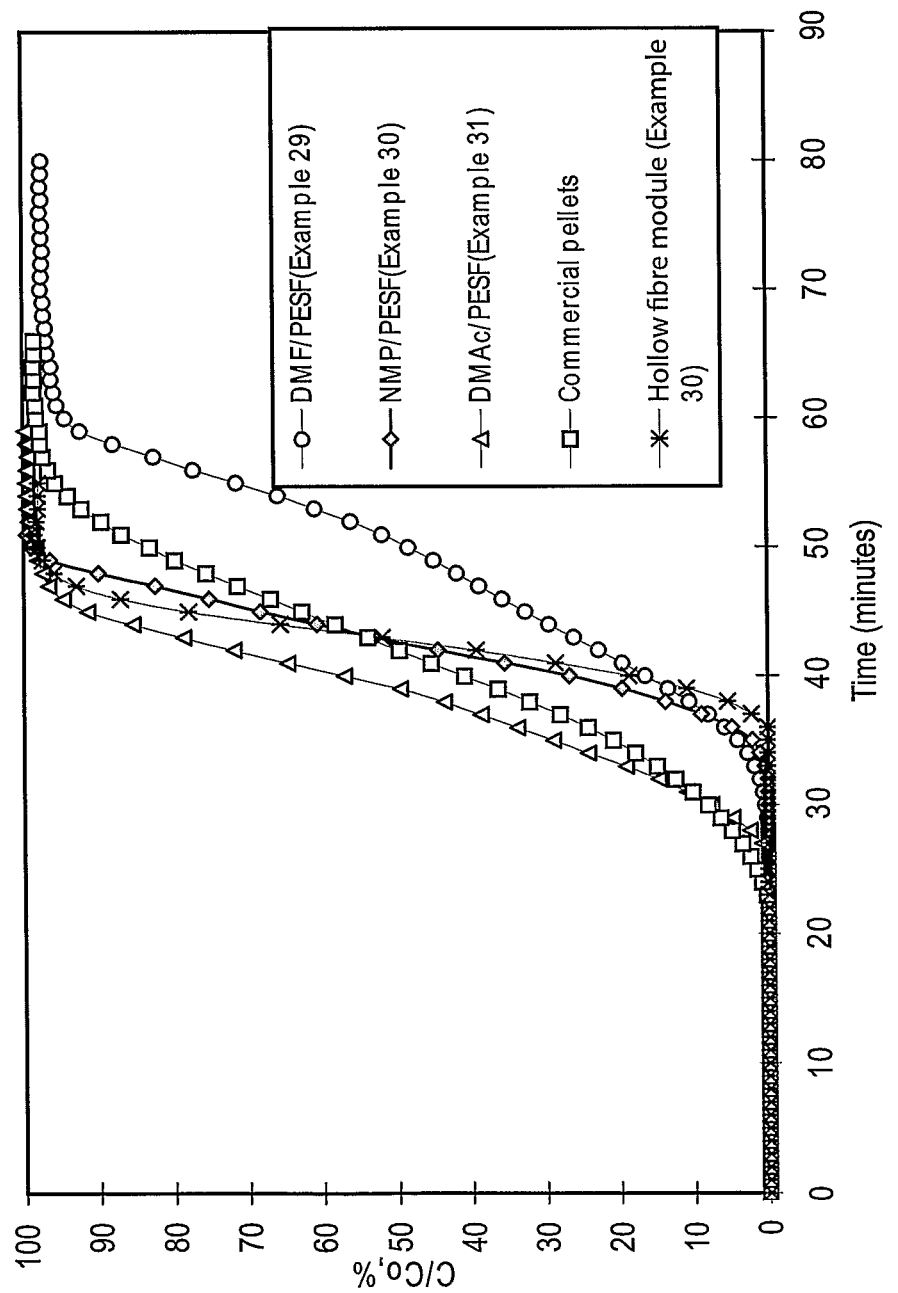
FIG. 44 shows a comparison of the breakthrough curves of butane onto composite silicalite hollow fibres (silicalite 75%: polymer 25% w/w) of examples 29 to 31 with those of commercial pellets (silicalite 75%: binder 25% w/w)

Dynamic Adsorption of N-Butane onto Silicalite Hollow Fibres Prepared from Different Solvents Adsorption properties of silicalite polymer composite hollow fibres were compared using the breakthrough curves of n-butane at a feed flow rate of 1.5 lmin$^{-1}$ and a concentration of 6000 ppm. FIG. 44 compares the breakthrough curves of the composite hollow fibres with that of the commercial pellets. The breakthrough curves reveal that, for all three adsorbent fibre samples, the time to breakthrough was higher than that of its equivalent particulate system. The breakthrough times of Example 29, Example 30, Example 31, Example 30 fibre module and commercial pellets are 34 mins, 37 mins, 28 mins 39 mins and 26 mins respectively. These results show that the breakthrough times increased as follows: commercial pellets<Example 31 (DMAc/PESF hollow fibre pellets)<Example 29 (DMF/PESF)<Example 30 (NMP/PESF hollow fibre pellets)<Example 30 (NMP/PESF hollow fibre module). This clearly demonstrates that the solvent type used during spinning has a significant influence on the structure and the porosity of the hollow fibre. Similarly polymer types were compared (PESF, PSF and polyvinylidenefluoride (PVDF)) and PESF gave the best results. The open finger-like structure in the fibre seems to be providing more accessibility for the adsorbate to reach the adsorption sites. The hollow fibre prepared from NMP solvent and PESF polymer gave the sharpest breakthrough curve and the longest time to breakthrough. The longer time to breakthrough and sharper breakthrough curves for the hollow fibre samples are indicative of a lower resistance to high adsorption capacity in the fibre than in the pellet. The breakthrough curve for hollow fibre prepared from DMF is broader than those for the equivalent pellets. Certainly, the higher molecular weight solvent NMP seems to be better than the DMF or DMAc for producing superior adsorbent hollow fibre structures.

The breakthrough performances of silicalite hollow fibres seems to be significantly better than the commercial pellets, indicating the importance of solvent and polymer contribution to its porosity and effective surface area in creating access to adsorption sites. These results are a clear indication that the polymer has not blocked the adsorption sites of the silicalite during manufacture. These results augur well for the hollow fibre composite systems.

EXAMPLE 32

Pre-Treatment Temperature

TABLE 8

| Example No. | Dope solution compositions (wt. %) | Viscosity (Pa · s) | Spinning parameters | |
|---|---|---|---|---|
| Example 32 (NMP/PESF) | NMP/PESF, 85/15 Silicalite/ PESF, 80/20 | 10.9 | Coagulation bath temperature (° C.) | 25 |
| | | | Injection rate of internal coagulant (ml/min) | 14 |
| | | | Nitrogen pressure (bar) | 2-3 |
| | | | Air gap (cm) | 3 |
| | | | Linear extrusion speed (rpm) | 40 |
| | | | Bore liquid | water |
| | | | External coagulant | water |

Further fibres according to the present invention were prepared according to the method of examples 29 to 31 using the composition and spinning conditions and parameters set out in Table 8 above. Both single and double layer fibres were spun from the same composition and varying the pre-treatment temperature.

Figure 45:
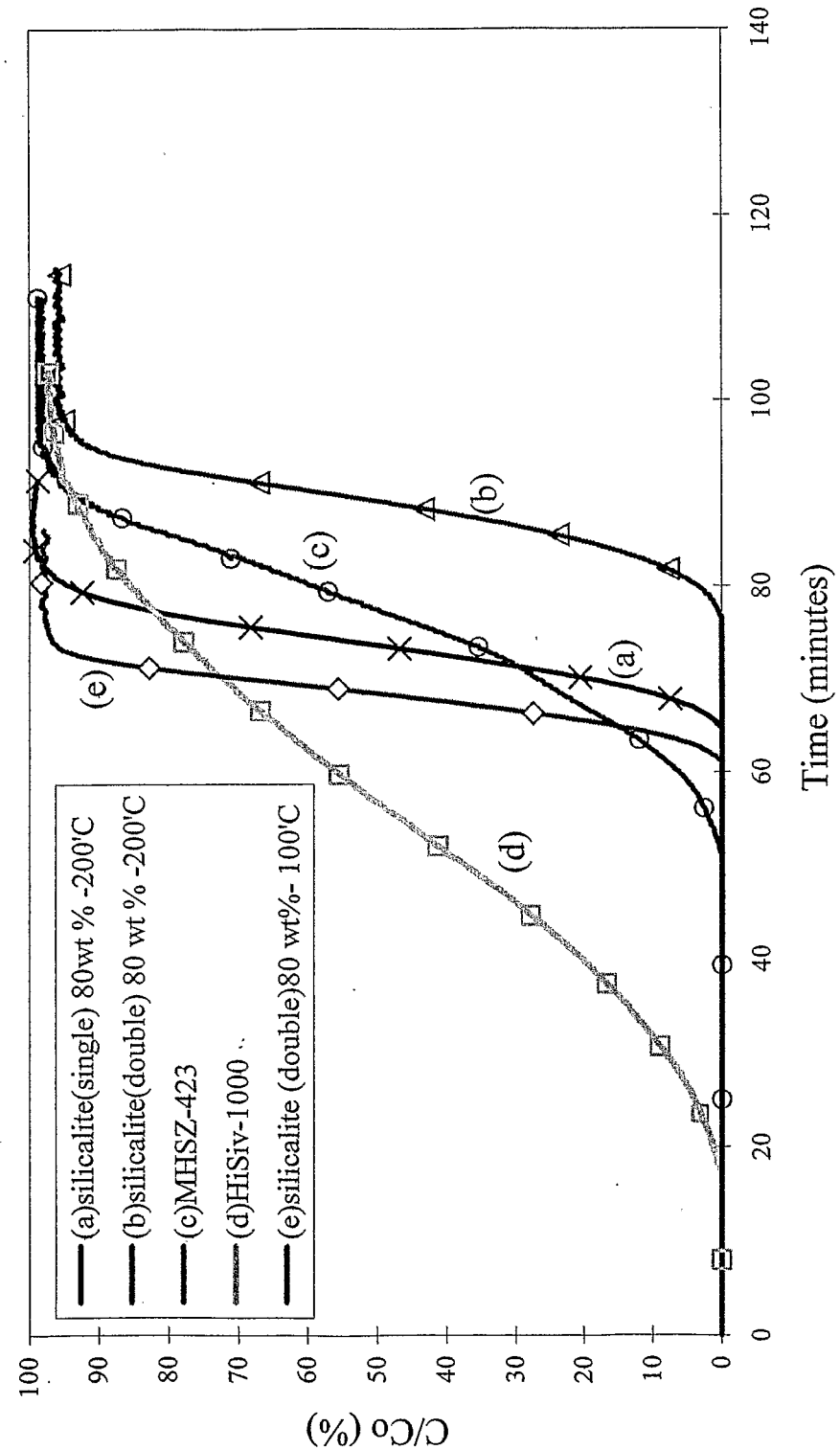
FIG. 45 shows a further set of breakthrough curves of butane onto silicalite hollow fibres in comparison with two commercial pellets.

FIG. 45 shows the breakthrough curves for fibres produced according to the present invention in comparison with commercially available pellets. The compositions are as follows:

(a) Single layer silicalite hollow fibre membrane (20% PESF; 80% silicalite (example 32); pretreatment temperature of 200° C.);

(b) Double-layer silicalite hollow fibre membrane (20% PESF; 80% silicate (example 32); pretreatment temperature of 200° C.);

(c) MHSZ-423 (Sphere 2 mm diameter): Commercial Silicalite. Assumed 20% binder; 80% silicalite (d) HiSiv 1000 (pellets 3 mm×6 mm): Commercial Silicalite. Assumed 20% binder; 80% silicalite; and (e) Double-layer silicate hollow fibre membrane (20% PESF; 80% silicalite (example 32); pre-treatment temperature of 100° C.)

The fibres according to the present invention were prepared according to example 32. They were subjected to pre-treatment conditions of either 100 or 200° C. as indicated to remove any trapped materials and to expose the active sites of adsorption. The adsorption properties of these fibres were compared with each other and with commercially available pellets using the breakthrough curves of n-butane at a feed flow rate of 1.5 L/min and a concentration of 5000 ppm.

Again, the fibres of the present invention have a sharper breakthrough point than the commercially available pellets and have a longer time to breakthrough. FIG. 45 also shows the effect of double and single layer and also the pre-treatment temperature on the performance of the fibre. Increasing from a single to a double layer increases the breakthrough time as does increasing the pre-treatment temperature from 100 to 200° C. This is another variable which may therefore be used to tune the properties of the fibre during manufacture.

Figure 46A:
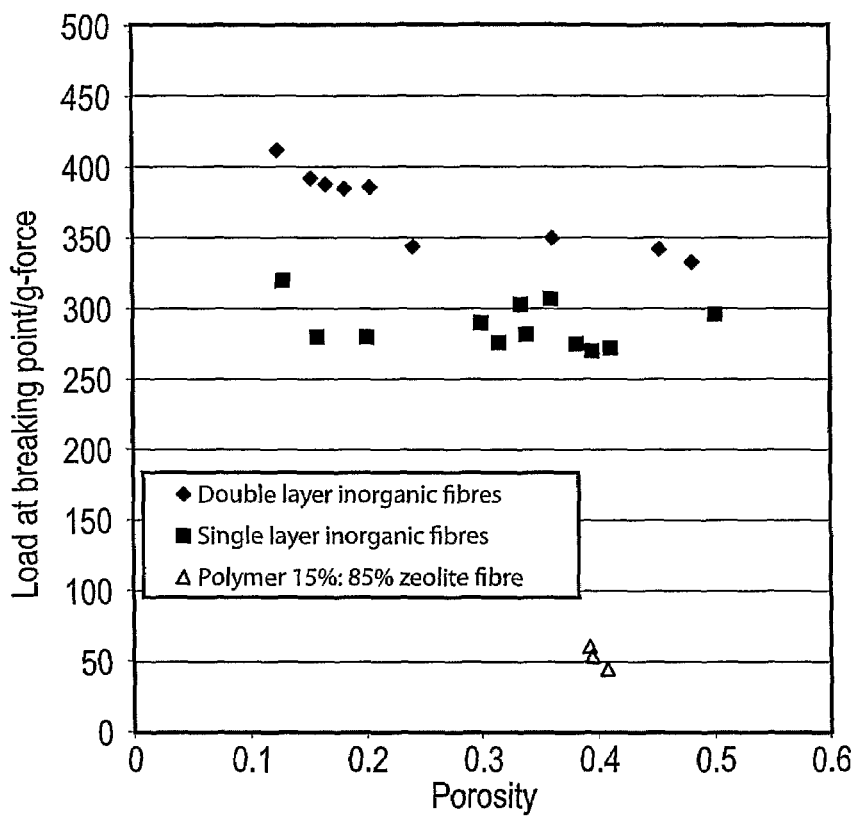
FIGS. 46a and 46b show the mechanical strength of compact fibres—single, double and triple.
Figure 46B:
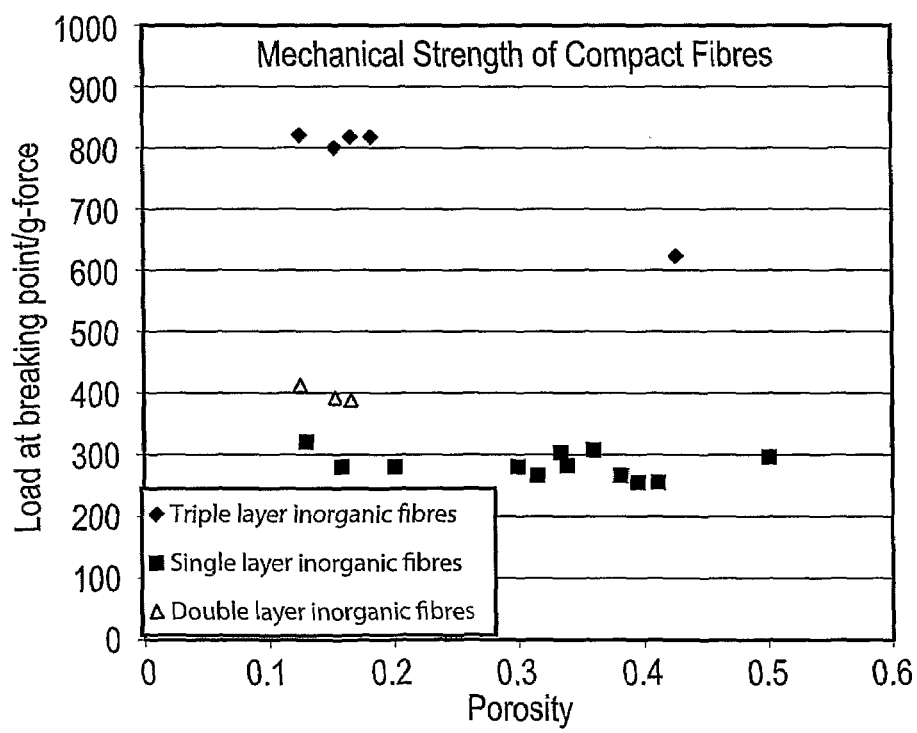

As mentioned above, FIG. 46 shows the mechanical strength of compact fibres produced according to the present invention. In particular, the graphs compare the strength of single, double and triple layer fibres by looking at the load at breaking point of a number of samples. It can clearly be seen that double layer fibres are stronger than single layer fibres (see FIG. 46a) and triple layer fibres are mechanically substantially stronger than double layer (the strength is more than double)—see FIG. 46b.

The invention claimed is:

1. An organic hollow fibre comprising a polymer; a binder; and an inorganic adsorbent material, wherein the inorganic adsorbent material is present at a level greater than 65 wt. %; and wherein the fibre has a flexibility greater than 5° bending angle from the midpoint of the fibre.

2. The organic hollow fibre of claim 1 wherein the polymer is selected from the group consisting of PESF, polysulfone, polyvinylidenefluoride (PVDF), polyethylene, polypropylene, poly(phenylene oxide), polyrnethylmethacrylate, poly(vinyl chloride), Polysulfone, Poly(ether sulfone), Poly(vinylidene fluoride), Polyacrylonitrile, Cellulose acetate, Polymide Poly(ether imide). Polyamide (aromatic), Polyimide, Poly(ether imide) and poly(vinyl alcohol) co-polymers of Polylactide (PLA) and Polyglycolide (PGA), Polycaprolactone (PCL) and Poly (ethylene terephathalate) (PET).

3. The organic hollow fibre of claim 1, wherein the inorganic adsorbent material is a zeolite.

4. The organic hollow fibre of claim 3, wherein the zeolite is a high silica zeolite.

5. The organic hollow fibre of claim 1, wherein the hollow fibre has an additional thin outer coating.

6. The organic hollow fibre of claim 5, wherein the outer coating is of the same composition as the hollow fibre.

7. The organic hollow fibre of claim 5, wherein the outer coating is of a different composition than the hollow fibre.

8. The organic hollow fibre of claim 5, wherein the outer coating is a high purity polymer.

9. The organic hollow fibre of claim 1, wherein the hollow fibre comprises two or more layers.

10. The organic hollow fibre of claim 9, wherein the hollow fibre is a double-layer fibre.

11. The organic hollow fibre of claim 9, wherein the hollow fibre is a triple-layer fibre.

12. The organic hollow fibre of claim 9, wherein the two or more layers are of the same composition.

13. The organic hollow fibre of claim 9, wherein the two or more layers are of different compositions.

14. The organic hollow fibre of claim 13, wherein the different compositions have different functionality.

15. The organic hollow fibre of claim 1, wherein the fibre has a mechanical strength of greater than 200g force at a crosshead speed of 1.0 mm/sec for a fibre with an effective surface porosity of 0.1-0.2, as calculated from Knudsen flow method.

16. The organic hollow fibre of claim 1, wherein the fibre has an area to volume ratio greater than 1000 $m^2/m^3$.

17. The organic hollow fibre of claim 1, wherein the fibre is produced by a single stage process which does not include a firing step.

* * * * *